United States Patent
Xu et al.

(10) Patent No.: US 12,532,302 B2
(45) Date of Patent: Jan. 20, 2026

(54) PHYSICAL DOWNLINK CONTROL CHANNEL COEXISTENCE FOR DIFFERENT USER EQUIPMENT CATEGORIES

(71) Applicant: QUALCOMM Incorporated, San Diego, CA (US)

(72) Inventors: Huilin Xu, Temecula, CA (US); Peter Pui Lok Ang, San Diego, CA (US); Renqiu Wang, San Diego, CA (US); Krishna Kiran Mukkavilli, San Diego, CA (US); Tingfang Ji, San Diego, CA (US); Joseph Binamira Soriaga, San Diego, CA (US); Yeliz Tokgoz, San Diego, CA (US); Wanshi Chen, San Diego, CA (US); Yuwei Ren, Beijing (CN); Jing Lei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 794 days.

(21) Appl. No.: 17/596,352

(22) PCT Filed: Jun. 12, 2019

(86) PCT No.: PCT/CN2019/090840
§ 371 (c)(1),
(2) Date: Dec. 8, 2021

(87) PCT Pub. No.: WO2020/248151
PCT Pub. Date: Dec. 17, 2020

(65) Prior Publication Data
US 2022/0225330 A1    Jul. 14, 2022

(51) Int. Cl.
*H04W 72/23* (2023.01)
*H04W 72/0453* (2023.01)

(52) U.S. Cl.
CPC ....... *H04W 72/0453* (2013.01); *H04W 72/23* (2023.01)

(58) Field of Classification Search
CPC .................... H04W 72/0453; H04W 72/23
See application file for complete search history.

(56) References Cited

U.S. PATENT DOCUMENTS 10,079,658 B2    9/2018    Chen et al.
11,606,130 B2 *  3/2023    Cha ........................ H04B 7/088
                            (Continued)

FOREIGN PATENT DOCUMENTS

CN    109479293 A    3/2019
JP    2020523927 A   8/2020
                 (Continued)

OTHER PUBLICATIONS

International Search Report and Written Opinion—PCT/CN2019/090840—ISA/EPO—Mar. 6, 2020.
(Continued)

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation. The UE may monitor for a physical downlink control channel (PDCCH) candidate based at least in part on a determination that the (Continued)

PDCCH candidate is fully contained within the second frequency domain resource allocation. Numerous other aspects are provided.

20 Claims, 13 Drawing Sheets

(56) References Cited

U.S. PATENT DOCUMENTS

| | | | |
|---|---|---|---|
| 2018/0287734 A1 | 10/2018 | Lee et al. | |
| 2018/0288749 A1 | 10/2018 | Sun et al. | |
| 2018/0324770 A1 | 11/2018 | Nogami et al. | |
| 2019/0082427 A1 | 3/2019 | Kim et al. | |
| 2019/0141734 A1 | 5/2019 | Lei et al. | |
| 2019/0166593 A1* | 5/2019 | Liao | H04L 5/0094 |
| 2019/0357185 A1* | 11/2019 | Kwak | H04L 1/0072 |
| 2020/0280524 A1* | 9/2020 | Guo | H04L 5/0048 |
| 2022/0029862 A1* | 1/2022 | Gao | H04L 5/0078 |
| 2022/0124686 A1* | 4/2022 | Lee | H04L 5/0094 |

FOREIGN PATENT DOCUMENTS

| | | |
|---|---|---|
| JP | 2021503745 A | 2/2021 |
| WO | 2013067266 | 5/2013 |
| WO | 2018126431 A1 | 7/2018 |
| WO | 2018147996 A1 | 8/2018 |
| WO | 2018204806 A1 | 11/2018 |
| WO | 2018228379 A1 | 12/2018 |
| WO | 2019090743 A1 | 5/2019 |
| WO | 2019097475 A1 | 5/2019 |
| WO | 2019098059 A1 | 5/2019 |
| WO | 2019099393 A1 | 5/2019 |

OTHER PUBLICATIONS

Mediatek Inc: "Discussions on Search Space and CORESET Designs", 3GPP TSG RAN WG1 Meeting #90bis, 3GPP Draft, R1-1718323, Discussions on Search Space and CORESET Designs_Final, 3rd Generation Partnership Project (3GPP), Mobile Competence Centre; 650, Route Des Lucioles; F-06921 Sophia-Antipolis Cedex, vol. RAN WG1, No. Prague, CZ; Oct. 9, 2017-Oct. 13, 2017, Oct. 8, 2017 (Oct. 8, 2017), 11 Pages, XP051341506, Section 2.1, par. 1-4, Section 2.2, Section 3.3, the whole document.

Samsung: "Remaining Issues on PDCCH and Search Space Design", R1-1811640, 3GPP TSG RAN WG1 Meeting #94bis, Chengdu, China, Oct. 8-12, 2018, 8 Pages.

Samsung: "DL Control for URLLC", 3GPP TSG RAN WG1 #97, R1-1906955, EURLLC DL Control, 3rd Generation Partnership Project, Mobile Competence Centre, 650, Route Des Lucioles, F-06921 Sophia-Antipolis Cedex, France, vol. RAN WG1, No. Reno, USA , May 13, 2019-May 17, 2019, May 13, 2019, XP051728405, 4 Pages, Section 2.2 "UE Capability for PDCCH Monitoring".

Spreadtrum Communications: "Discussion on PDCCH Enhancements for URLLC", R1-1906357, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051727807, 15 Pages, Section 2.2, Par. 1 and Sections "2.2.1 CCEs limits" and "2.2.2 BDs limits", Par. 1, 2, Appendix 5.

Supplementary European Search Report—EP199323346—Search Authority—The Hague—Dec. 19, 2022.

3GPP: 3rd Generation Partnership Project, Technical Specification Group Radio Access Network, NR, Physical layer Procedures for Control (Release 15), TS 38.213 V15.5.0, Mar. 2019, 104 Pages.

Samsung: "DL Control for URLLC", 3GPP TSG RAN WG1 #97, R1-1906955, Reno, USA, May 13, 2019-May 17, 2019, May 4, 2019, 4 Pages.

Intel Corporation: "NR-PDCCH Physical Structure", R1-1710541, 3GPP TSG-RAN WG1 NR Ad-Hoc#2 Qingdao, P. R. China, Jun. 27-30, 2017, Jun. 17, 2017, pp. 1-7.

Nokia., et al., "On UE features 3-1, 5-1, 5-1a, 6-1, 6-2 and Capability to FDM Slot and Mini-slot", R1-1807282, 3GPP TSG RAN WG1 Meeting #93 Busan, South Korea, May 21-25, 2018 May 11, 2018, 5 Pages.

* cited by examiner

PHYSICAL DOWNLINK CONTROL CHANNEL COEXISTENCE FOR DIFFERENT USER EQUIPMENT CATEGORIES

CROSS-REFERENCE TO RELATED APPLICATION

This application is a 371 national stage of Patent Cooperation Treaty (PCT) Application No. PCT/CN2019/090840 filed on Jun. 12, 2019, entitled "PHYSICAL DOWNLINK CONTROL CHANNEL COEXISTENCE FOR DIFFERENT USER EQUIPMENT CATEGORIES," which is hereby expressly incorporated by reference herein.

FIELD OF THE DISCLOSURE

Aspects of the present disclosure generally relate to wireless communication and to techniques and apparatuses for physical downlink control channel coexistence for different user equipment categories.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include receiving a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation; and monitoring for a physical downlink control channel (PDCCH) candidate based at least in part on a determination that the PDCCH candidate is fully contained within the second frequency domain resource allocation.

In some aspects, a method of wireless communication, performed by a user equipment (UE), may include receiving a configuration that indicates a first control resource set (CORESET) configured for the UE, a second CORESET configured for the UE, and a shared search space (SS) set configuration that is used for both the first CORESET and the second CORESET, wherein the second CORESET overlaps in time with the first CORESET; and monitoring for one or more physical downlink control channel (PDCCH) candidates on at least one of the first CORESET or the second CORESET according to the shared SS set configuration.

In some aspects, a method of wireless communication, performed by a wireless communication device, may include partitioning a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET; mapping a set of control channel elements (CCEs) of a physical downlink control channel (PDCCH) candidate to a set of resource element groups (REGs) of the first CORESET; and relocating one or more REGs of the set of REGs to be frequency-aligned with corresponding REGs configured for the second CORESET based at least in part on a determination that the one or more REGs are included in the second sub-band.

In some aspects, a method of wireless communication, performed by a wireless communication device, may include identifying a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation; identifying a set of resource element groups (REGs) for a physical downlink control channel (PDCCH) candidate included in the second frequency domain resource allocation; and relocating the set of REGs to be frequency-aligned with corresponding REGs configured for the first CORESET.

In some aspects, a method of wireless communication, performed by a base station, may include configuring a first control resource set (CORESET) for a first category of user equipments (UEs), wherein the first CORESET has a first frequency domain resource allocation; configuring a second CORESET for a second category of UEs, wherein the second CORESET overlaps in time with the first CORESET and has a second frequency domain resource allocation that is a subset of the first frequency domain resource allocation or that is mutually exclusive with the first frequency domain resource allocation; and transmitting a configuration that indicates the first CORESET and the second CORESET.

In some aspects, a UE for wireless communication may include memory and one or more processors operatively coupled to the memory. The memory and the one or more processors may be configured to receive a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation; and monitor for a physical downlink control channel (PDCCH) candidate based at least in part on a determination that the PDCCH candidate is fully contained within the second frequency domain resource allocation.

In some aspects, a UE for wireless communication may include memory and one or more processors operatively coupled to the memory. The memory and the one or more processors may be configured to receive a configuration that indicates a first control resource set (CORESET) configured for the UE, a second CORESET configured for the UE, and a shared search space (SS) set configuration that is used for both the first CORESET and the second CORESET, wherein the second CORESET overlaps in time with the first CORESET; and monitor for one or more physical downlink control channel (PDCCH) candidates on at least one of the first CORESET or the second CORESET according to the shared SS set configuration.

In some aspects, a wireless communication device for wireless communication may include memory and one or more processors operatively coupled to the memory. The memory and the one or more processors may be configured to partition a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET; map a set of control channel elements (CCEs) of a physical downlink control channel (PDCCH) candidate to a set of resource element groups (REGs) of the first CORESET; and relocate one or more REGs of the set of REGs to be frequency-aligned with corresponding REGs configured for the second CORESET based at least in part on a determination that the one or more REGs are included in the second sub-band.

In some aspects, a wireless communication device for wireless communication may include memory and one or more processors operatively coupled to the memory. The memory and the one or more processors may be configured to identify a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation; identify a set of resource element groups (REGs) for a physical downlink control channel (PDCCH) candidate included in the second frequency domain resource allocation; and relocate the set of REGs to be frequency-aligned with corresponding REGs configured for the first CORESET.

In some aspects, a base station for wireless communication may include memory and one or more processors operatively coupled to the memory. The memory and the one or more processors may be configured to means for configuring a first control resource set (CORESET) for a first category of user equipments (UEs), wherein the first CORESET has a first frequency domain resource allocation; means for configuring a second CORESET for a second category of UEs, wherein the second CORESET overlaps in time with the first CORESET and has a second frequency domain resource allocation that is a subset of the first frequency domain resource allocation or that is mutually exclusive with the first frequency domain resource allocation; and means for transmitting a configuration that indicates the first CORESET and the second CORESET.

In some aspects, a non-transitory computer-readable medium may store one or more instructions for wireless communication. The one or more instructions, when executed by one or more processors of a UE, may cause the one or more processors to: receive a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation; and monitor for a physical downlink control channel (PDCCH) candidate based at least in part on a determination that the PDCCH candidate is fully contained within the second frequency domain resource allocation.

In some aspects, a non-transitory computer-readable medium may store one or more instructions for wireless communication. The one or more instructions, when executed by one or more processors of a UE, may cause the one or more processors to: receive a configuration that indicates a first control resource set (CORESET) configured for the UE, a second CORESET configured for the UE, and a shared search space (SS) set configuration that is used for both the first CORESET and the second CORESET, wherein the second CORESET overlaps in time with the first CORESET; and monitor for one or more physical downlink control channel (PDCCH) candidates on at least one of the first CORESET or the second CORESET according to the shared SS set configuration.

In some aspects, a non-transitory computer-readable medium may store one or more instructions for wireless communication. The one or more instructions, when executed by one or more processors of a wireless communication device, may cause the one or more processors to: partition a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET; map a set of control channel elements (CCEs) of a physical downlink control channel (PDCCH) candidate to a set of resource element groups (REGs) of the first CORESET; and relocate one or more REGs of the set of REGs to be frequency-aligned with corresponding REGs configured for the second CORESET based at least in part on a determination that the one or more REGs are included in the second sub-band.

In some aspects, a non-transitory computer-readable medium may store one or more instructions for wireless communication. The one or more instructions, when executed by one or more processors of a wireless communication device, may cause the one or more processors to: identify a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation; identify a set of resource element groups (REGs) for a physical downlink control channel (PDCCH) candidate included in the second frequency domain resource allocation; and relocate the set of REGs to be frequency-aligned with corresponding REGs configured for the first CORESET.

In some aspects, a non-transitory computer-readable medium may store one or more instructions for wireless communication. The one or more instructions, when executed by one or more processors of a base station, may cause the one or more processors to: configure a first control resource set (CORESET) for a first category of user equipments (UEs), wherein the first CORESET has a first frequency domain resource allocation; configure a second CORESET for a second category of UEs, wherein the second CORESET overlaps in time with the first CORESET and has a second frequency domain resource allocation that is a subset of the first frequency domain resource allocation or that is mutually exclusive with the first frequency domain resource allocation; and transmit a configuration that indicates the first CORESET and the second CORESET.

In some aspects, a UE for wireless communication may include means for receiving a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation; and means for monitoring for a physical downlink control channel (PDCCH) candidate based at least in part on a determination that the PDCCH candidate is fully contained within the second frequency domain resource allocation.

In some aspects, a UE for wireless communication may include means for receiving a configuration that indicates a first control resource set (CORESET) configured for the UE, a second CORESET configured for the UE, and a shared search space (SS) set configuration that is used for both the first CORESET and the second CORESET, wherein the second CORESET overlaps in time with the first CORESET; and means for monitoring for one or more physical downlink control channel (PDCCH) candidates on at least one of the first CORESET or the second CORESET according to the shared SS set configuration.

In some aspects, a wireless communication device for wireless communication may include means for partitioning a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET; means for mapping a set of control channel elements (CCEs) of a physical downlink control channel (PDCCH) candidate to a set of resource element groups (REGs) of the first CORESET; and means for relocating one or more REGs of the set of REGs to be frequency-aligned with corresponding REGs configured for the second CORESET based at least in part on a determination that the one or more REGs are included in the second sub-band.

In some aspects, a wireless communication device for wireless communication may include means for identifying a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation; means for identifying a set of resource element groups (REGs) for a physical downlink control channel (PDCCH) candidate included in the second frequency domain resource allocation; and means for relocating the set of REGs to be frequency-aligned with corresponding REGs configured for the first CORESET.

In some aspects, a base station for wireless communication may include means for configuring a first control resource set (CORESET) for a first category of user equipments (UEs), wherein the first CORESET has a first frequency domain resource allocation; means for configuring a second CORESET for a second category of UEs, wherein the second CORESET overlaps in time with the first CORESET and has a second frequency domain resource allocation that is a subset of the first frequency domain resource allocation or that is mutually exclusive with the first frequency domain resource allocation; and means for transmitting a configuration that indicates the first CORESET and the second CORESET.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
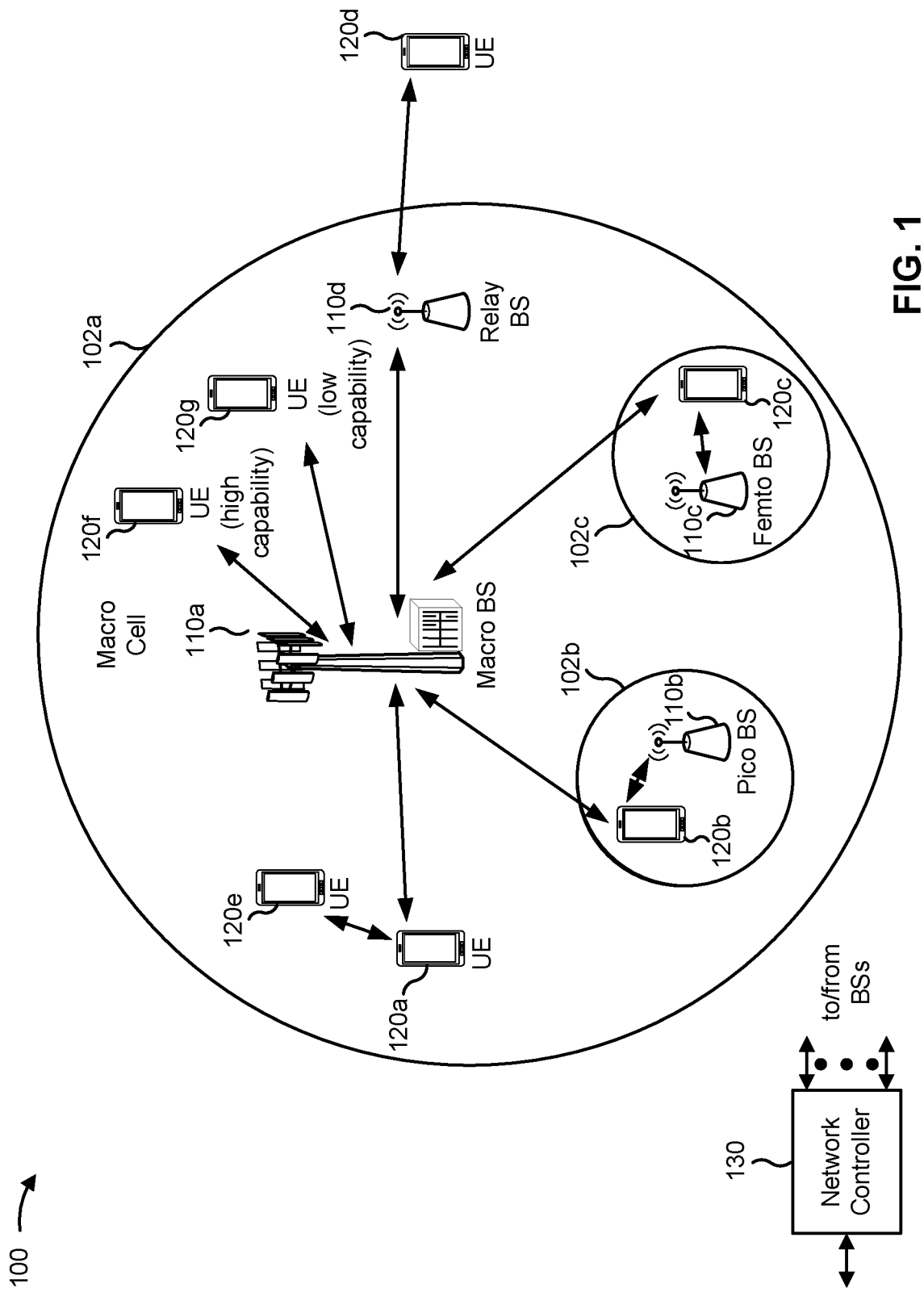
FIG. 1 is a block diagram conceptually illustrating an example of a wireless communication network, in accordance with various aspects of the present disclosure.

In 5G, different categories of UEs may operate with different capabilities. For example, a first category of UE may have a higher capability and/or an advanced feature set compared to a second category of UE. Likewise, the second category of UE may have a lower capability and/or a reduced feature set compared to the first category of UE. In some aspects, a maximum bandwidth with which UEs of the second category (sometimes referred to as low tier UEs herein) are capable of communicating is narrower than a maximum bandwidth with which UEs of the first category (sometimes referred to as premium UEs herein) are capable of communicating. In this case, a base station may independently configure different CORESETs for premium UEs and low tier UEs. However, this may result in low tier UEs and premium UEs independently monitoring separate PDCCHs (e.g., on separate time and/or frequency resources) even though those PDCCHs may carry some common control information to be used by both categories of UEs, thereby wasting network resources and channel bandwidth. Furthermore, because independently configuring different CORESETs for premium UEs and low tier UEs would result in independent interleaving of CCEs of PDCCHs of premium UEs and low tier UEs, the likelihood of partial overlap of PDCCH candidates of different categories of UEs would be increased, resulting in PDCCH interference and blocking.

To conserve network resources and reduce the likelihood of PDCCH interference, a first CORESET configured for premium UEs and a second CORESET configured for low tier UEs may overlap in frequency, with the second CORESET occupying a subset of the frequency domain resources occupied by the first CORESET. In some cases, SS set occasions for low tier UEs and premium UEs may be configured without any overlap in time or with a partial overlap in time (e.g., an SS set for a low tier UE may not overlap or may partially overlap with an SS set for a premium UE). However, this would require separate PDCCH communications for low tier UEs and premium UEs, thereby wasting network resources by preventing shared control information from being communicated to both low tier UEs and premium UEs in the same PDCCH communication.

Some techniques and apparatuses described herein permit configuration of CORESETs for premium UEs and low tier UEs with SS set occasions that overlap completely in time. This may permit shared control information for both premium UEs and low tier UEs to be communicated in the same PDCCH communication, which may be monitored by both premium UEs and low tier UEs, thereby conserving network resources and channel bandwidth. Furthermore, due to a full overlap of PDCCHs of different UE categories, PDCCH interference and blocking due to a partial overlap may be avoided. Some techniques and apparatuses described herein also permit distributive CCE-to-REG mapping, thereby increasing resource diversity.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a base station 110 may serve different UEs 120 of different categories, different UEs 120 that support different capabilities, and/or the like. For example, the base station 110 may serve a first UE 120f that has a more advanced capability (e.g., a higher capability) and a second UE 120g that has a less advanced capability (e.g., a lower capability). For example, the first UE 120f may be a first category of UE 120 (e.g., an NR UE) that is capable of communicating using more bandwidth, and the second UE 120g may be a second category of UE 120 (e.g., an NR-Lite UE) that is capable of communicating using less bandwidth (e.g., that is not capable of operating using a full bandwidth with which the first category of UEs are capable of operating). Additionally, or alternatively, the second UE 120g may have a reduced feature set compared to the first UE 120f.

As indicated above, FIG. 1 is provided as an example. Other examples may differ from what is described with regard to FIG. 1.

Figure 2:
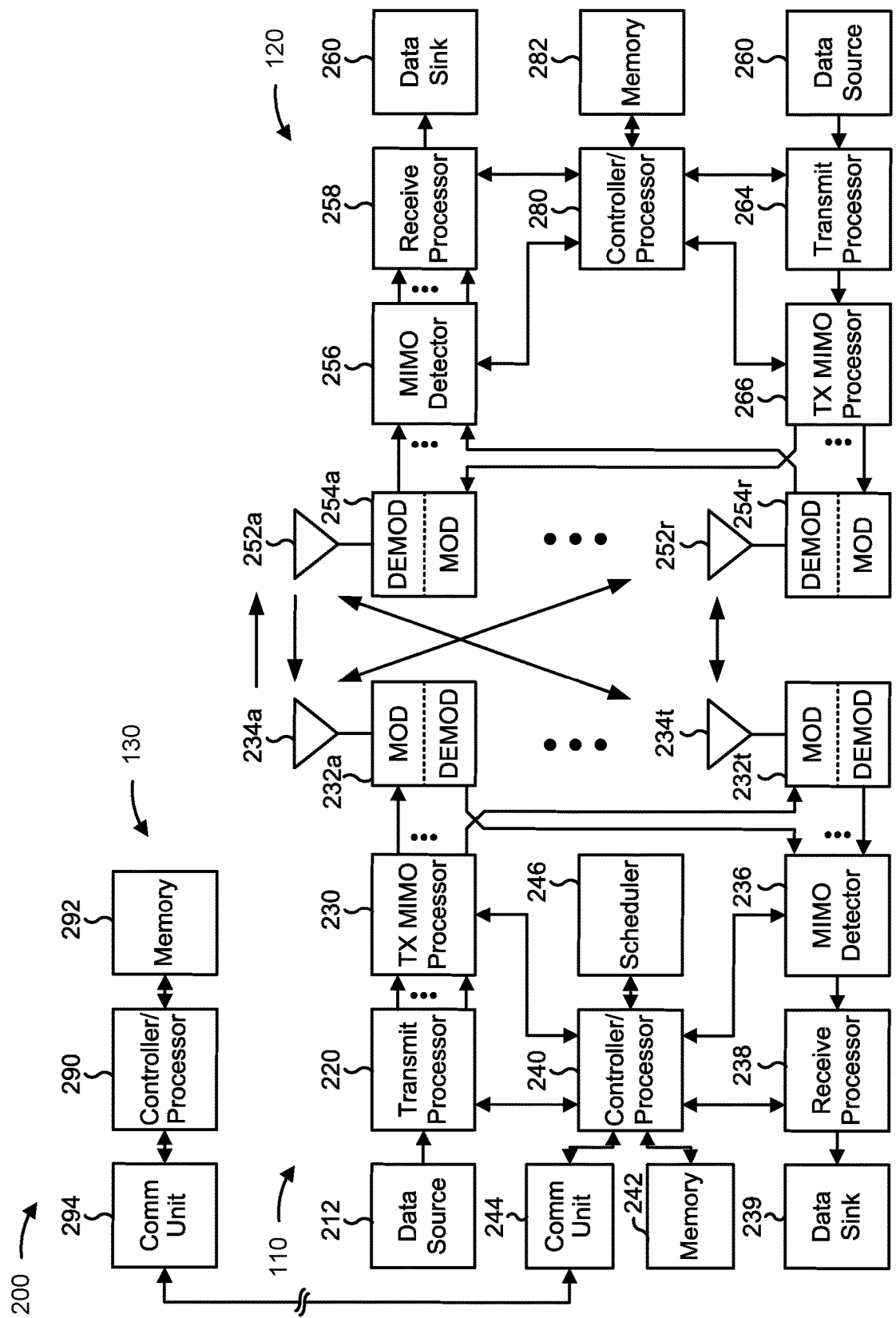
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical downlink control channel coexistence for different user equipment categories, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

Figure 9:
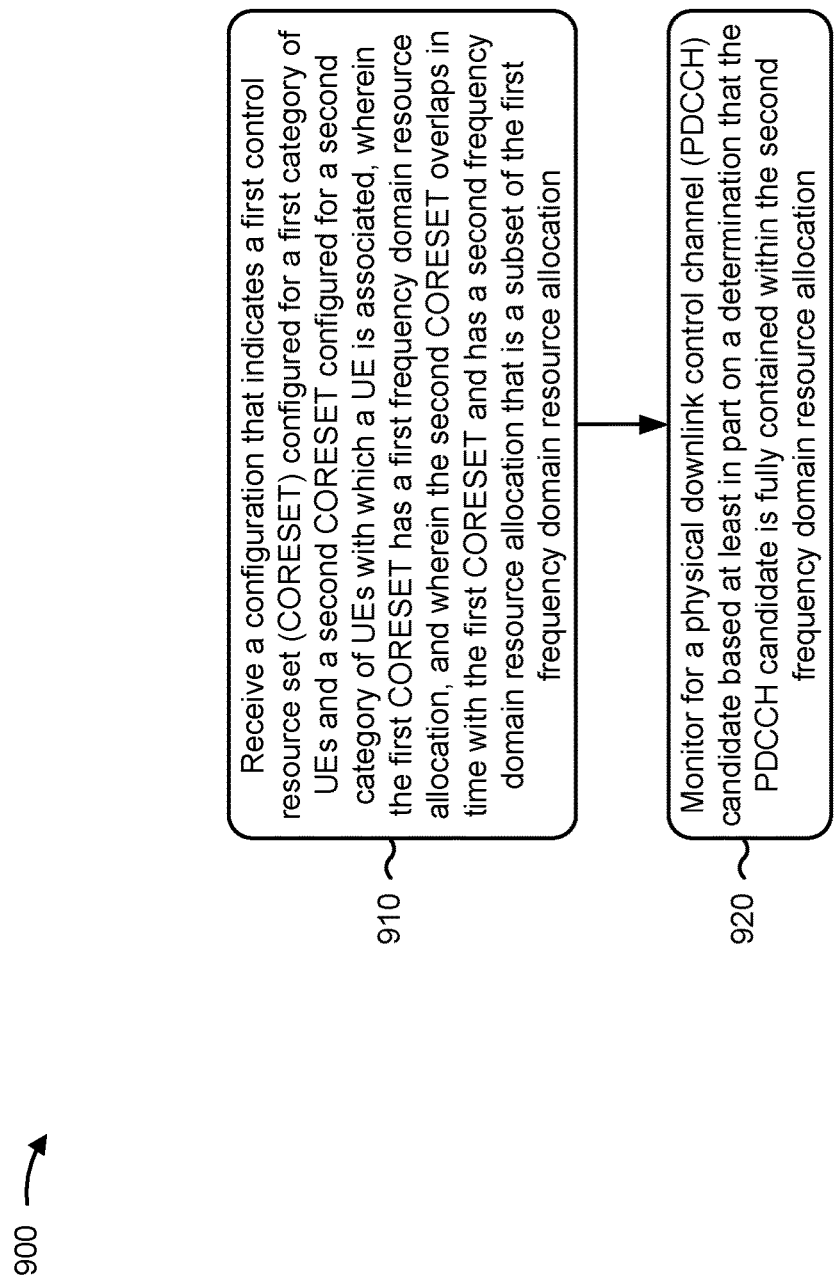
FIGS. 9-13 are diagrams illustrating example processes relating to physical downlink control channel coexistence for different user equipment categories, in accordance with various aspects of the present disclosure.
Figure 10:
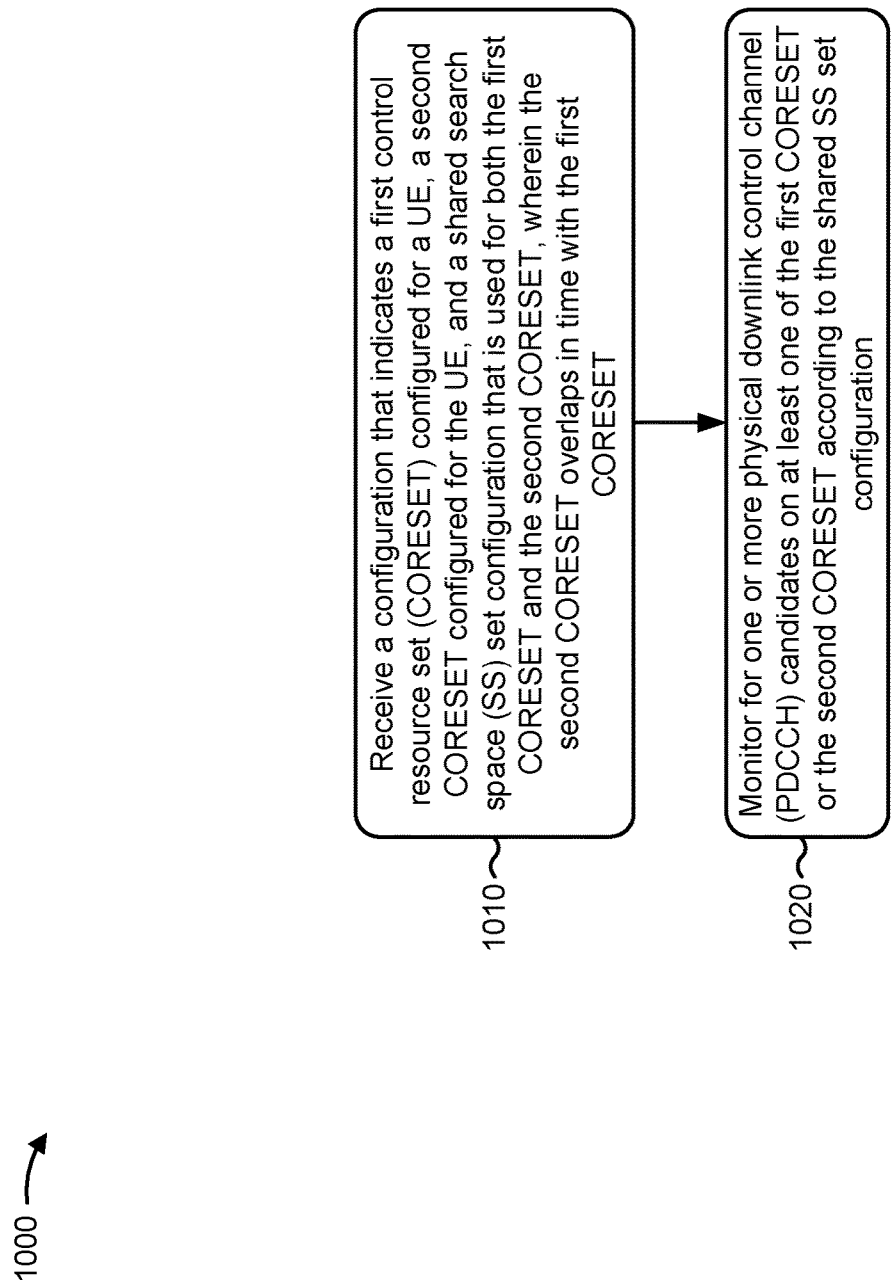
Figure 11:
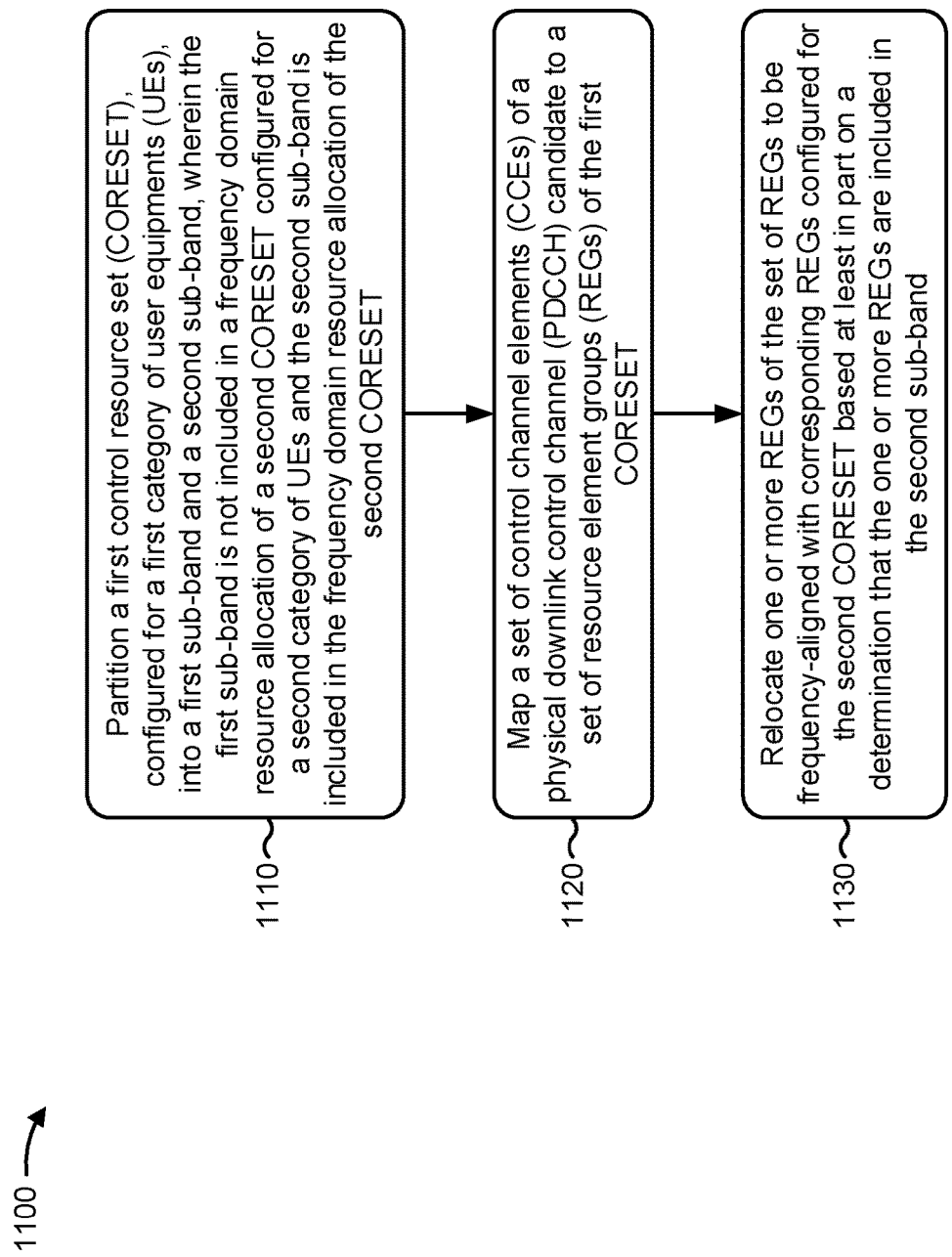
Figure 12:
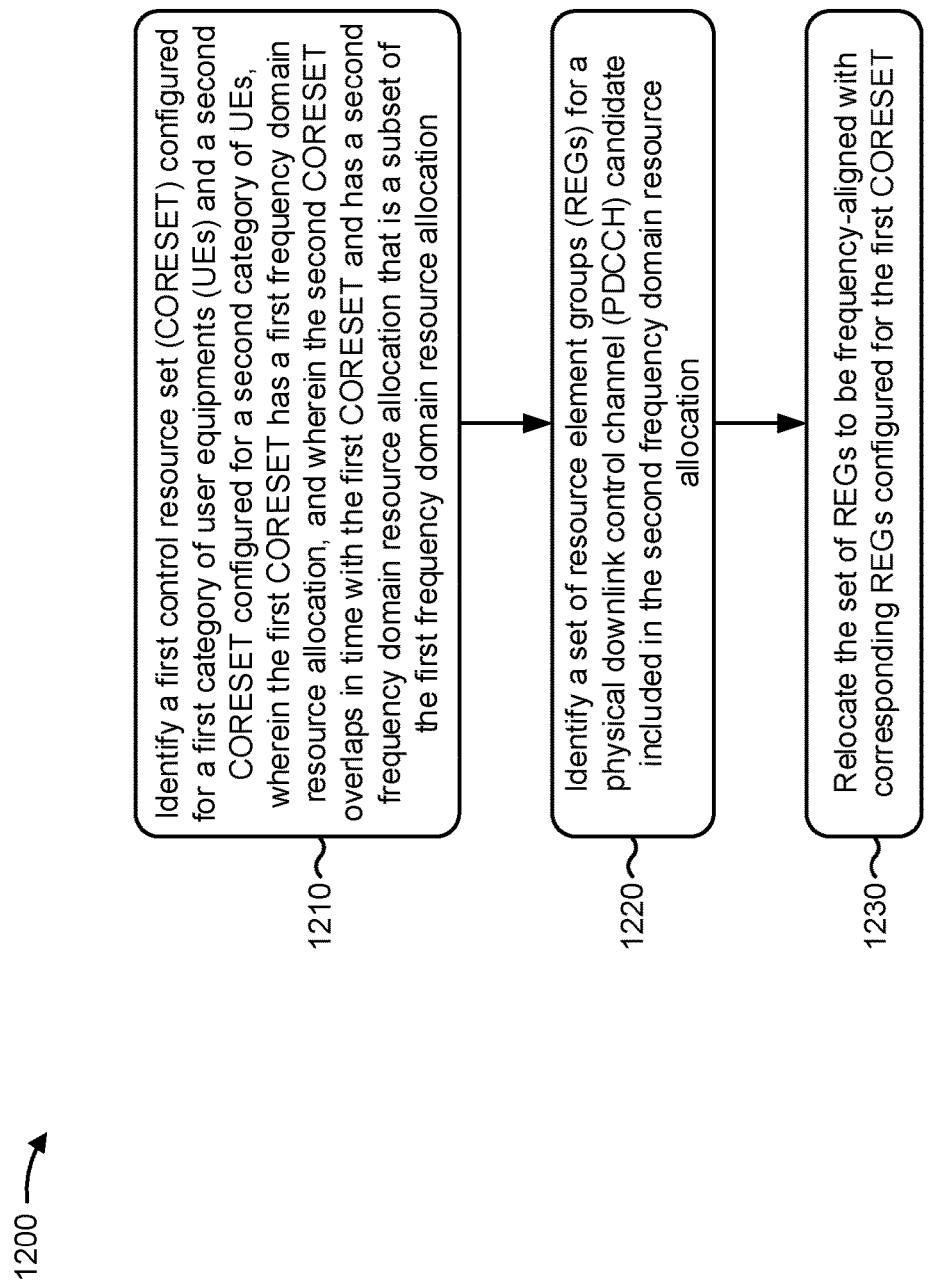

The stored program codes, when executed by processor 280 and/or other processors and modules at UE 120, may cause the UE 120 to perform operations described with respect to process 900 of FIG. 9, process 1000 of FIG. 10, process 1100 of FIG. 11, process 1200 of FIG. 12, and/or other processes as described herein. The stored program codes, when executed by processor 240 and/or other processors and modules at base station 110, may cause the base station 110 to perform operations described with respect to process 1100 of FIG. 11, process 1200 of FIG. 12, process 1300 of FIG. 13, and/or other processes as described herein. A scheduler 246 may schedule UEs for data transmission on the downlink and/or uplink.

In some aspects, UE 120 may include means for receiving a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation; means for monitoring for a physical downlink control channel (PDCCH) candidate based at least in part on a determination that the PDCCH candidate is fully contained within the second frequency domain resource allocation; and/or the like. Additionally, or alternatively, UE 120 may include means for receiving a configuration that indicates a first control resource set (CORESET) configured for the UE, a second CORESET configured for the UE, and a shared search space (SS) set configuration that is used for both the first CORESET and the second CORESET, wherein the second CORESET overlaps in time with the first CORESET; means for monitoring for one or more physical downlink control channel (PDCCH) candidates on at least one of the first CORESET or the second CORESET according to the shared SS set configuration; and/or the like. Additionally, or alternatively, UE 120 may include means for partitioning a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET; means for mapping a set of control channel elements (CCEs) of a physical downlink control channel (PDCCH) candidate to a set of resource element groups (REGs) of the first CORESET; means for relocating one or more REGs of the set of REGs to be frequency-aligned with corresponding REGs configured for the second CORESET based at least in part on a determination that the one or more REGs are included in the second sub-band; and/or the like. Additionally, or alternatively, UE 120 may include means for identifying a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation; means for identifying a set of resource element groups (REGs) for a physical downlink control channel (PDCCH) candidate included in the second frequency domain resource allocation; means for relocating the set of REGs to be frequency-aligned with corresponding REGs configured for the first CORESET; and/or the like. In some aspects, such means may include one or more components of UE 120 described in connection with FIG. 2.

In some aspects, base station 110 may include means for partitioning a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET; means for mapping a set of control channel elements (CCEs) of a physical downlink control channel (PDCCH) candidate to a set of resource element groups (REGs) of the first CORESET; means for relocating one or more REGs of the set of REGs to be frequency-aligned with corresponding REGs configured for the second CORESET based at least in part on a determination that the one or more REGs are included in the second sub-band; and/or the like. Additionally, or alternatively, base station 110 may include means for identifying a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation; means for identifying a set of resource element groups (REGs) for a physical downlink control channel (PDCCH) candidate included in the second frequency domain resource allocation; means for relocating the set of REGs to be frequency-aligned with corresponding REGs configured for the first CORESET; and/or the like. Additionally, or alternatively, base station 110 may include means for configuring a first control resource set (CORESET) for a first category of user equipments (UEs), wherein the first CORESET has a first frequency domain resource allocation; means for configuring a second CORESET for a second category of UEs, wherein the second CORESET overlaps in time with the first CORESET and has a second frequency domain resource allocation that is a subset of the first frequency domain resource allocation or that is mutually exclusive with the first frequency domain resource allocation; means for transmitting a configuration that indicates the first CORESET and the second CORESET; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
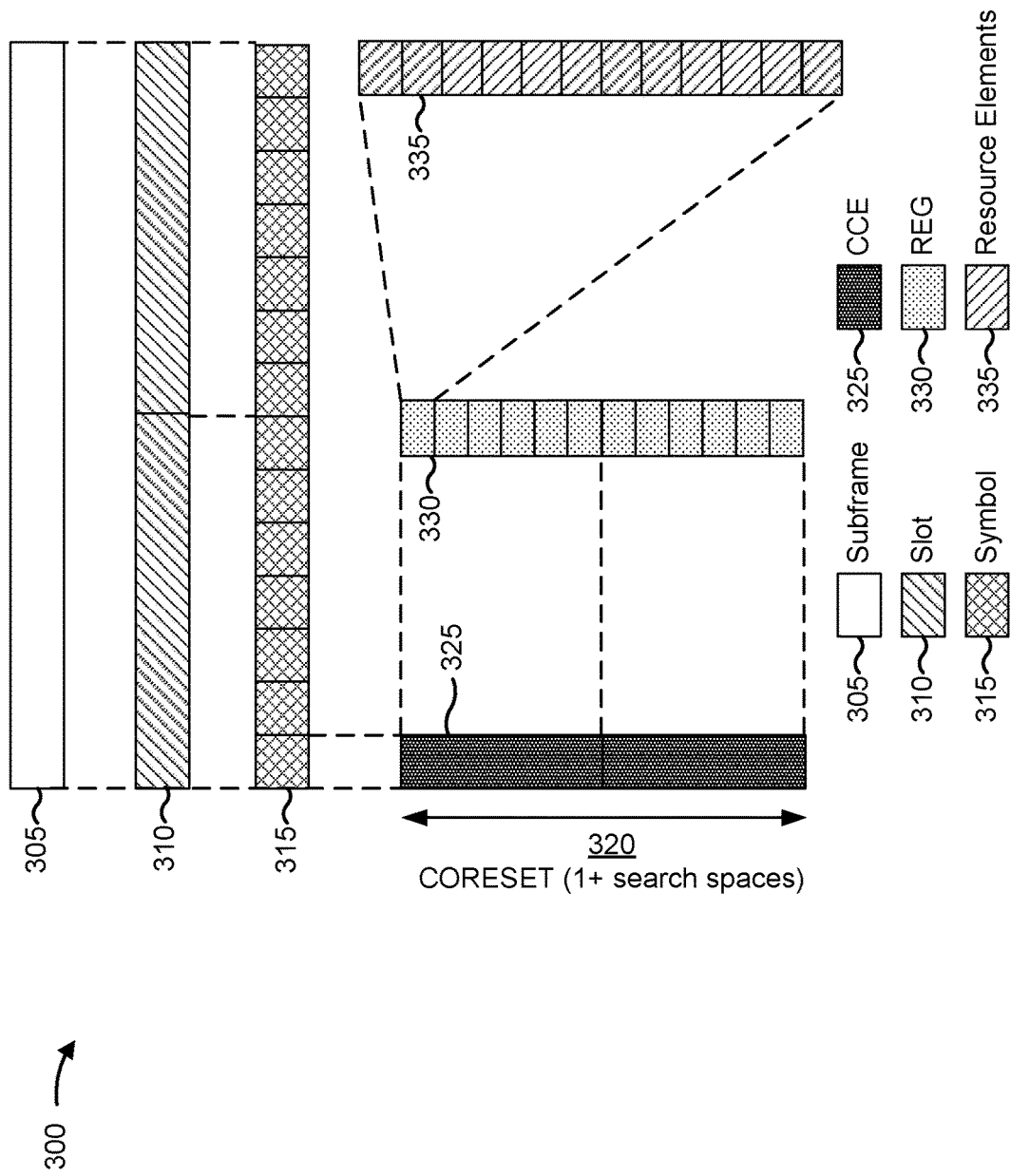
FIG. 3 illustrates an example resource structure for wireless communication, in accordance with various aspects of the present disclosure.

FIG. 3 illustrates an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols (e.g., for LTE) or 14 symbols (e.g., for NR) per slot.

The potential control region of a slot 310 may be referred to as a control resource set (CORESET) 320, and may be structured to support an efficient use of resources, such as by flexible configuration or reconfiguration of resources of the CORESET 320 for one or more physical downlink control channels (PDCCHs), one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks in the frequency domain, and either one, two, or three symbols 315 in the time domain.

In 5G, a number of resources included in the CORESET 320 may be flexibly configured, such as by using radio resource control (RRC) signaling to indicate a frequency domain region (e.g., a number of resource blocks) and/or a time domain region (e.g., a number of symbols) for the CORESET 320. A CORESET (e.g., a CORESET configuration) may define a size of a control region for PDCCH communications, and a search space (SS) set (e.g., an SS set configuration) may define a location of the control region in the time domain. For example, a CORESET configuration may indicate frequency domain resource blocks (RBs) and a time domain duration (e.g., a number of consecutive symbols, such as 1, 2, or 3 symbols) occupied by the control region. An SS set configuration may indicate a time domain periodicity (e.g., in units of slots) for the control region, a number of slots in the periodicity, and/or symbol locations within a slot for the control region. In some aspects, more than one control region may be configured in a slot 310. Additionally, or alternatively, more than one SS set can be associated with a single CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the number of CCEs 325 used for transmission of DCI represents the aggregation level used by the base station for the transmission of DCI. In FIG. 3, an aggregation level of two is shown as an example, corresponding to two CCEs 325 in a slot 310. In some aspects, different aggregation levels may be used, such as 1, 2, 4, 8, 16, and/or the like.

Each CCE 325 includes a group of resource element groups (REGs) 330, such as 6 REGs. A REG 330 includes a resource block that includes 12 resource elements (REs) 335 within a symbol 315. A resource element 335 may occupy one subcarrier in the frequency domain and one symbol (e.g., an OFDM symbol) in the time domain.

A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. Similarly, the set of all possible PDCCH locations for a particular group of UEs may be referred to as a group-common search space. A search space may be defined by a combination of a CORESET configuration that indicates a size of a control region in time and frequency and an SS set configuration that indicates a time domain location (e.g., a periodic time domain location) for the search space. A search space set may be defined by the set of all search spaces with the same search space ID across all aggregation levels.

In 5G, different categories of UEs may operate with different capabilities. For example, a first category of UE (e.g., an NR UE, a premium UE, a high tier UE, an advanced feature set UE, and/or the like) may have a higher capability and/or an advanced feature set compared to a second category of UE. Likewise, the second category of UE (e.g., an NR-Lite UE, a low tier UE, a moderate tier UE, a reduced feature set UE, and/or the like) may have a lower capability and/or a reduced feature set compared to the first category of UE. For example, UEs of the second category may support a lower maximum modulation and coding scheme (MCS) than UEs of the first category (e.g., quadrature phase shift keying (QPSK) or the like as compared to 256-quadrature amplitude modulation (QAM) or the like), may support a lower transmit power than UEs of the first category, may have a less advanced beamforming capability than UEs of the first category, may be capable of communicating on a narrower maximum bandwidth part than UEs of the first category, may not be capable of communicating using a shortened transmission time interval (TTI) (e.g., a slot length of 1 ms or less, 0.5 ms, 0.25 ms, 0.125 ms, 0.0625 ms, and/or the like, depending on a sub-carrier spacing) with which UEs of the first category are capable of communicating, and/or the like.

In some aspects, a maximum bandwidth with which UEs of the second category (sometimes referred to as low tier UEs herein) are capable of communicating is narrower than a maximum bandwidth with which UEs of the first category (sometimes referred to as premium UEs herein) are capable of communicating. In this case, a base station may independently configure different CORESETs for premium UEs and low tier UEs. However, this may result in low tier UEs and premium UEs independently monitoring separate PDCCHs (e.g., on separate time and/or frequency resources) even though those PDCCHs may carry some common control information to be used by both categories of UEs, thereby wasting network resources and channel bandwidth. Furthermore, because independently configuring different CORESETs for premium UEs and low tier UEs would result in independent interleaving of CCEs (described in more detail below in connection with FIG. 4) of PDCCHs of premium UEs and low tier UEs, the likelihood of partial overlap of PDCCH candidates of different categories of UEs would be increased, resulting in PDCCH interference and blocking.

To conserve network resources and reduce the likelihood of PDCCH interference, a first CORESET configured for premium UEs and a second CORESET configured for low tier UEs may overlap in frequency, with the second CORESET occupying a subset of the frequency domain resources occupied by the first CORESET. In some cases, SS set occasions for low tier UEs and premium UEs may be configured without any overlap in time or with a partial overlap in time (e.g., an SS set for a low tier UE may not overlap or may partially overlap with an SS set for a premium UE). However, this would require separate PDCCH communications for low tier UEs and premium UEs, thereby wasting network resources by preventing shared control information from being communicated to both low tier UEs and premium UEs in the same PDCCH communication.

Some techniques and apparatuses described herein permit configuration of CORESETs for premium UEs and low tier UEs with SS set occasions that overlap completely in time.

This may permit shared control information for both premium UEs and low tier UEs to be communicated in the same PDCCH communication, which may be monitored by both premium UEs and low tier UEs, thereby conserving network resources and channel bandwidth. Furthermore, due to a full overlap of PDCCHs of different UE categories, PDCCH interference and blocking due to a partial overlap may be avoided. Some techniques and apparatuses described herein also permit distributive CCE-to-REG mapping (described below in connection with FIG. 4), thereby increasing resource diversity.

As indicated above, FIG. 3 is provided as an example. Other examples may differ from what is described with regard to FIG. 3.

Figure 4:
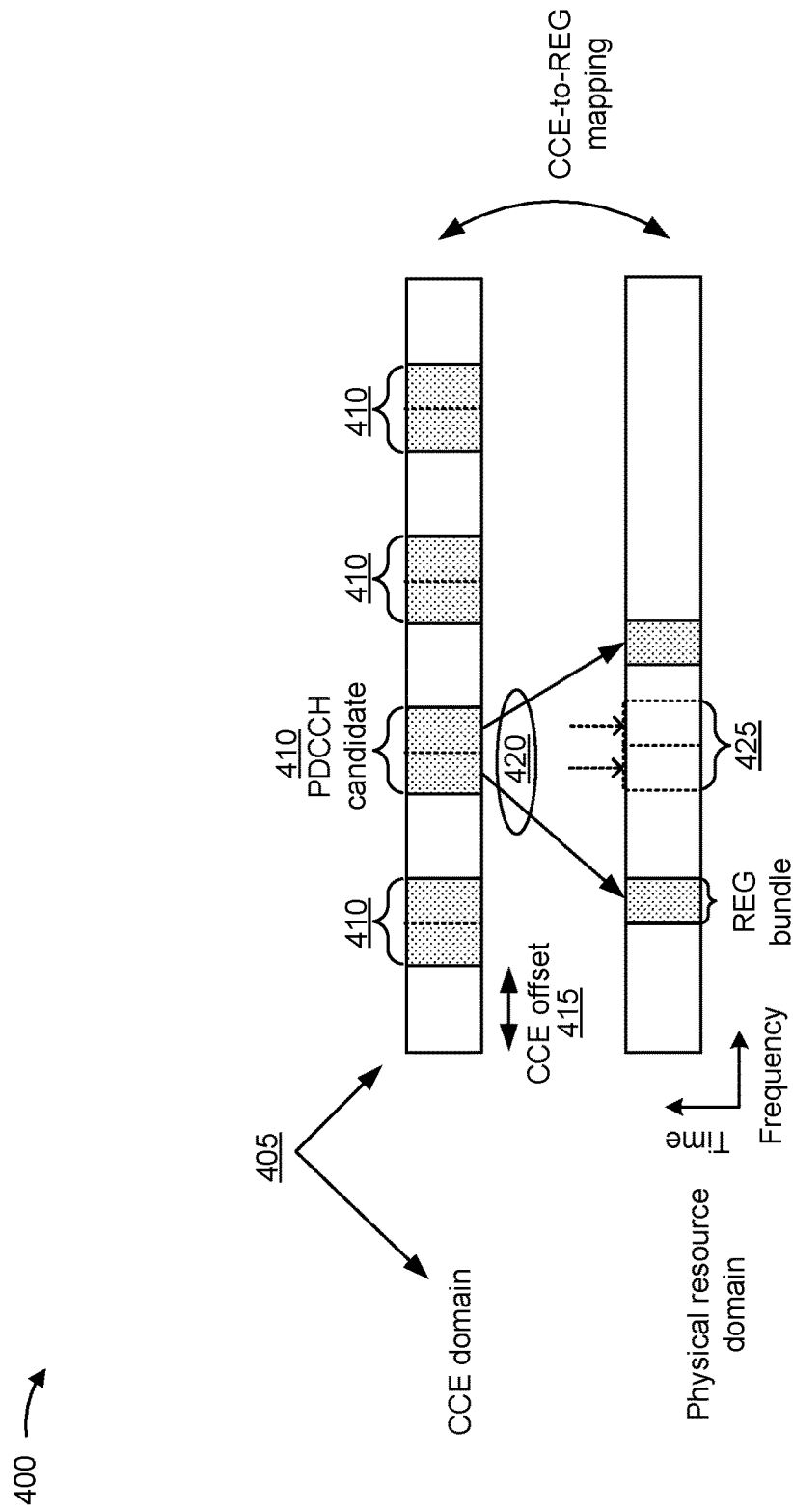
FIG. 4 illustrates an example of control channel element to resource element group mapping, in accordance with various aspects of the present disclosure.

FIG. 4 illustrates an example 400 of control channel element to resource element group mapping, in accordance with various aspects of the present disclosure.

As shown by reference number 405, to allocate resources for the PDCCH, a wireless communication device (e.g., a base station) may perform CCE indexing to allocate one or more CCEs to each PDCCH candidate in a CCE domain. As shown by reference number 410, in the CCE domain, a set of contiguous CCEs (shown as two contiguous CCEs in FIG. 4) are allocated to a PDCCH candidate. The number of contiguous CCEs that are allocated to a PDCCH candidate is defined by the aggregation level. For example, an aggregation level of one means that one CCE is allocated to a PDCCH candidate, an aggregation level of two means that two contiguous CCEs are allocated to a PDCCH candidate, an aggregation level of four means that four contiguous CCEs are allocated to a PDCCH candidate, and so on. As shown by reference number 415, a CCE offset may define a starting CCE, from a pool of CCE resources in the CCE domain, for a first PDCCH candidate. The CCE offset may be a function of a slot number. As further shown, PDCCH candidates may be spaced equally in the CCE domain.

As shown by reference number 420, after performing CCE indexing, if distributive CCE-to-REG mapping is enabled (e.g., if a CCE-to-REG mapping type is configured in an interleaved mode), then the wireless communication device may map different CCEs of a PDCCH candidate to different REG bundles that are scattered in frequency in the physical resource domain (e.g., in a frequency domain). A REG bundle may refer to a set of indivisible resources, and adjacent CCEs may be distributed to discontiguous REG bundles. As shown by reference number 425, if distributive CCE-to-REG mapping is disabled (e.g., if a CCE-to-REG mapping type is configured in a non-interleaved mode), then the wireless communication device may map different CCEs of a PDCCH candidate to different REG bundles that are contiguous in frequency in the physical resource domain (e.g., in a frequency domain). Thus, distributive CCE-to-REG mapping provides resource diversity in the physical resource domain (e.g., frequency diversity). After performing CCE-to-REG mapping, the wireless communication device may perform RE mapping by mapping modulation symbols of a PDCCH candidate (e.g., a PDCCH payload) to REs included in the allocated REGs (e.g., in a RE index first, symbol index second manner).

As indicated above, FIG. 4 is provided as an example. Other examples may differ from what is described with regard to FIG. 4.

Figure 5:
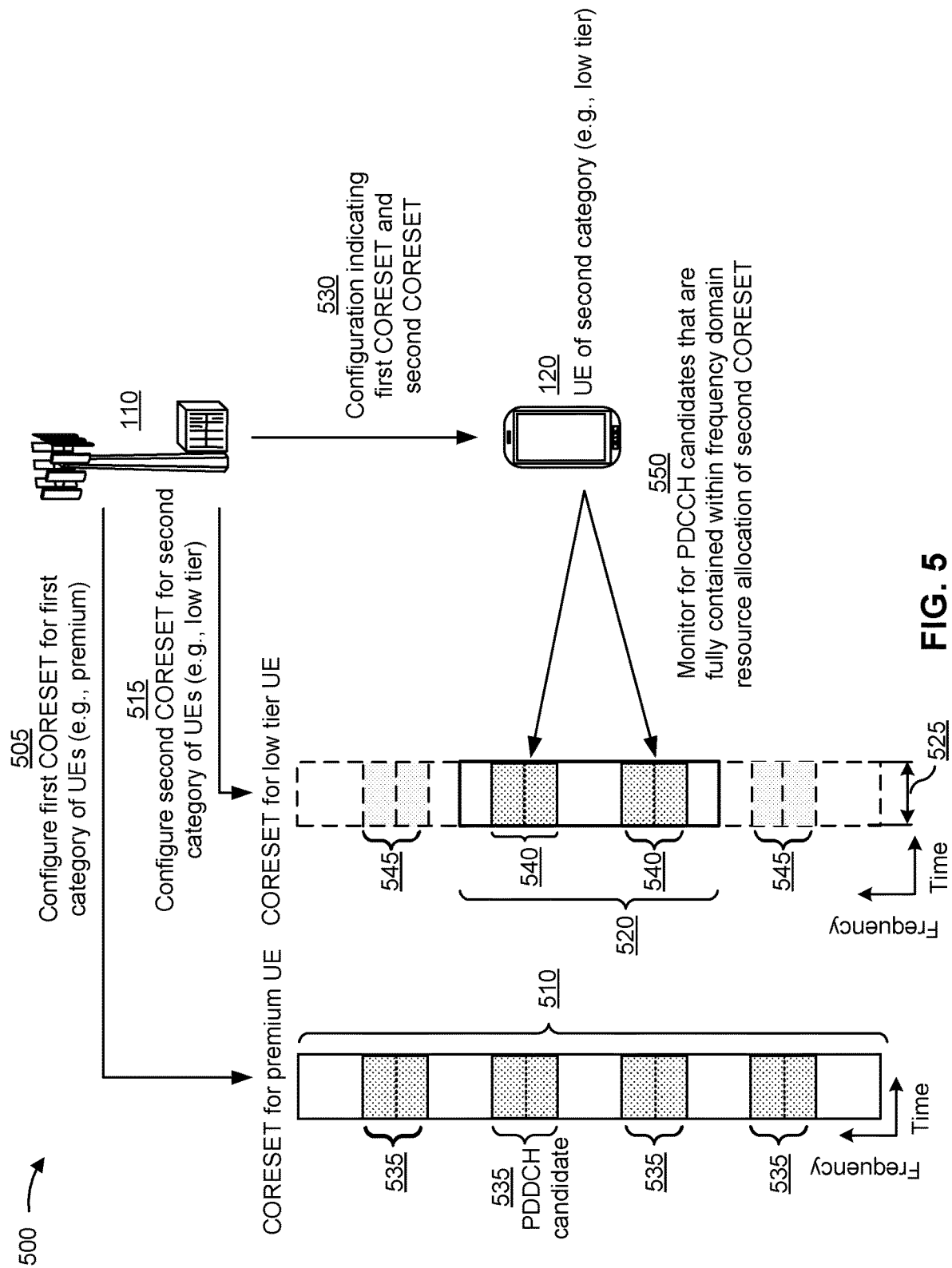
FIGS. 5-8 are diagrams illustrating examples of physical downlink control channel coexistence for different user equipment categories, in accordance with various aspects of the present disclosure.

FIG. 5 is a diagram illustrating an example 500 of PDCCH coexistence for different UE categories, in accordance with various aspects of the present disclosure. As shown in FIG. 5, a base station 110 and a UE 120 may communicate with one another.

As shown by reference number 505, the base station 110 may configure a first CORESET for a first category of UEs, such as premium UEs. As shown by reference number 510, the first CORESET may have a first frequency domain resource allocation.

As shown by reference number 515, the base station 110 may configure a second CORESET for a second category of UEs, such as low tier UEs. As shown by reference number 520, the second CORESET may have a second frequency domain resource allocation that is a subset of the first frequency domain resource allocation. For example, the first frequency domain resource allocation may include a first set of sub-carriers and/or RBs. The second frequency domain resource allocation may include a second, smaller set of sub-carriers and/or RBs, and all of the sub-carriers and/or RBs included in the second set may also be included in the first set.

As shown by reference number 525, a search space occasion associated with the second CORESET may overlap completely in time with a search space occasion associated with the first CORESET. For example, the first CORESET and the second CORESET may be allocated the same set of symbols, and all of the symbols of each CORESET may also be included in the other CORESET, as opposed to a partial overlap in time where only some symbols of one of the CORESETs overlaps with the symbols of the other CORESET. For example, the base station 110 may configure a first SS set occasion of the first CORESET and a second SS set occasion of the second CORESET to overlap completely in time. Additionally, or alternatively, the base station 110 may configure the first CORESET and the second CORESET to be the same duration (e.g., to have the same number of symbols). Thus, the first CORESET and the second CORESET may have the same time domain duration (e.g., according to a CORESET configuration) and may occur in the same time domain location(s) (e.g., according to an SS set configuration). In this way, shared control information for both premium UEs and low tier UEs can be communicated in the same PDCCH communication, thereby conserving network resources. Furthermore, due to the full overlap of PDCCHs of different UE categories, PDCCH interference and blocking due to a partial overlap may be avoided.

As shown by reference number 530, the base station 110 may transmit, to a UE 120, a configuration that indicates the first CORESET and the second CORESET. As shown in FIG. 5, in some aspects, the UE 120 may be a UE of the second category (e.g., a low tier UE). In some aspects, the configuration may indicate (e.g., in one or more CORESET configurations) a first frequency domain allocation for the first CORESET and a second frequency domain allocation for the second CORESET. The first frequency domain allocation may be indicated using, for example, a resource block bitmap. Additionally, or alternatively, the second frequency domain allocation may be indicated using a resource block bitmap, a starting resource block, an ending resource block, a range of resource blocks, and/or the like. In some aspects, the configuration is transmitted in a radio resource control (RRC) message, such as an RRC configuration message, an RRC reconfiguration message, and/or the like.

In some cases, because the second frequency domain allocation is a subset of the first frequency domain allocation, a starting RB and/or an ending RB for the second frequency domain allocation may be indicated as an offset from a starting RB and/or an ending RB of the first frequency domain allocation, which may conserve signaling overhead as compared to indicating an absolute (rather than a relative) RB or an RB bitmap. Additionally, or alternatively, the second frequency domain allocation may be indicated as a starting or ending resource block and a number of resource blocks that span the second frequency domain resource allocation (e.g., a start and length indicator value and/or the like).

As shown by reference number 535, in some aspects, the base station 110 may perform frequency mapping for PDCCH candidates using the first frequency domain resource allocation. For example, the base station 110 may perform CCE-to-REG mapping (as described above in connection with FIG. 4) using the first frequency domain resource allocation of the first CORESET as the physical resource domain to which REGs are mapped from CCEs. As shown by reference number 540, a subset of the PDCCH candidates mapped to the first frequency domain resource allocation may be included in the second frequency domain resource allocation. As shown by reference number 545, in some aspects, another subset of the PDCCH candidates mapped to the first frequency domain resource allocation may not be included in the second frequency domain resource allocation. In this way, one or more PDCCH candidates (e.g., as shown by reference number 540) may be used to convey shared control information that is to be used by both a low tier UE and a premium UE while still permitting premium UEs to monitor for PDCCH candidates (e.g., as shown by reference number 545) using a larger frequency domain resource allocation than that allocated for low tier UEs.

In example 500, the base station 110 may disable distributive CCE-to-REG mapping. For example, the configuration transmitted to the UE 120 may indicate a CCE-to-REG mapping type (e.g., using a cce-REG-MappingType parameter) that is set to a non-interleaved mode (e.g., a nonInterleaved value) for the first CORESET and for the second CORESET. Using distributive CCE-to-REG mapping in example 500 would scatter CCEs of a PDCCH candidate across the first frequency domain resource allocation of the first CORESET, which may result in some RBs of a PDCCH candidate being included in the second frequency domain resource allocation of the second CORESET and other RBs of the same PDCCH candidate being excluded from the second frequency domain allocation. In this case, a low tier UE would be unable to monitor all RBs of the PDCCH candidate. Thus, the base station 110 may disable distributive CCE-to-REG mapping in the scenario of example 500 (e.g., where the second CORESET overlaps in time with the first CORESET and has a second frequency domain resource allocation that is a subset of the first frequency domain resource allocation).

As shown by reference number 550, the UE 120 (e.g., a low tier UE and/or a UE of the second category) may monitor for a PDCCH candidate based at least in part on a determination that the PDCCH candidate is fully contained within the second frequency domain resource allocation. Additionally, or alternatively, the UE 120 may refrain from monitoring for a PDCCH candidate that is not fully contained within the second frequency domain resource allocation. In FIG. 5, the UE 120 may monitor for PDCCH candidates represented by reference number 540, and may refrain from monitoring for PDCCH candidates represented by reference number 545. In some aspects, the UE 120 may determine that a PDCCH candidate is fully contained within the second frequency domain resource allocation if all resource blocks of the PDCCH candidate are within the second frequency domain resource allocation.

In some aspects, a high tier UE (or a UE of the first category) may monitor for PDCCH candidates in the first frequency domain resource allocation regardless of whether those PDCCH candidates are fully contained or not fully contained in the second frequency domain resource allocation. In FIG. 5, a high tier UE may monitor for PDCCH candidates represented by reference number 540, and may also monitor for PDCCH candidates represented by reference number 545. In this way, shared control information for both premium UEs and low tier UEs can be communicated in the same PDCCH communication (e.g., using the PDCCH candidates that are fully contained within the second frequency domain resource allocation), thereby conserving network resources. Furthermore, due to the full overlap in time of PDCCH candidates of different UE categories, PDCCH interference and blocking due to a partial PDCCH candidate overlap may be avoided.

As indicated above, FIG. 5 is provided as an example. Other examples may differ from what is described with regard to FIG. 5.

Figure 6:
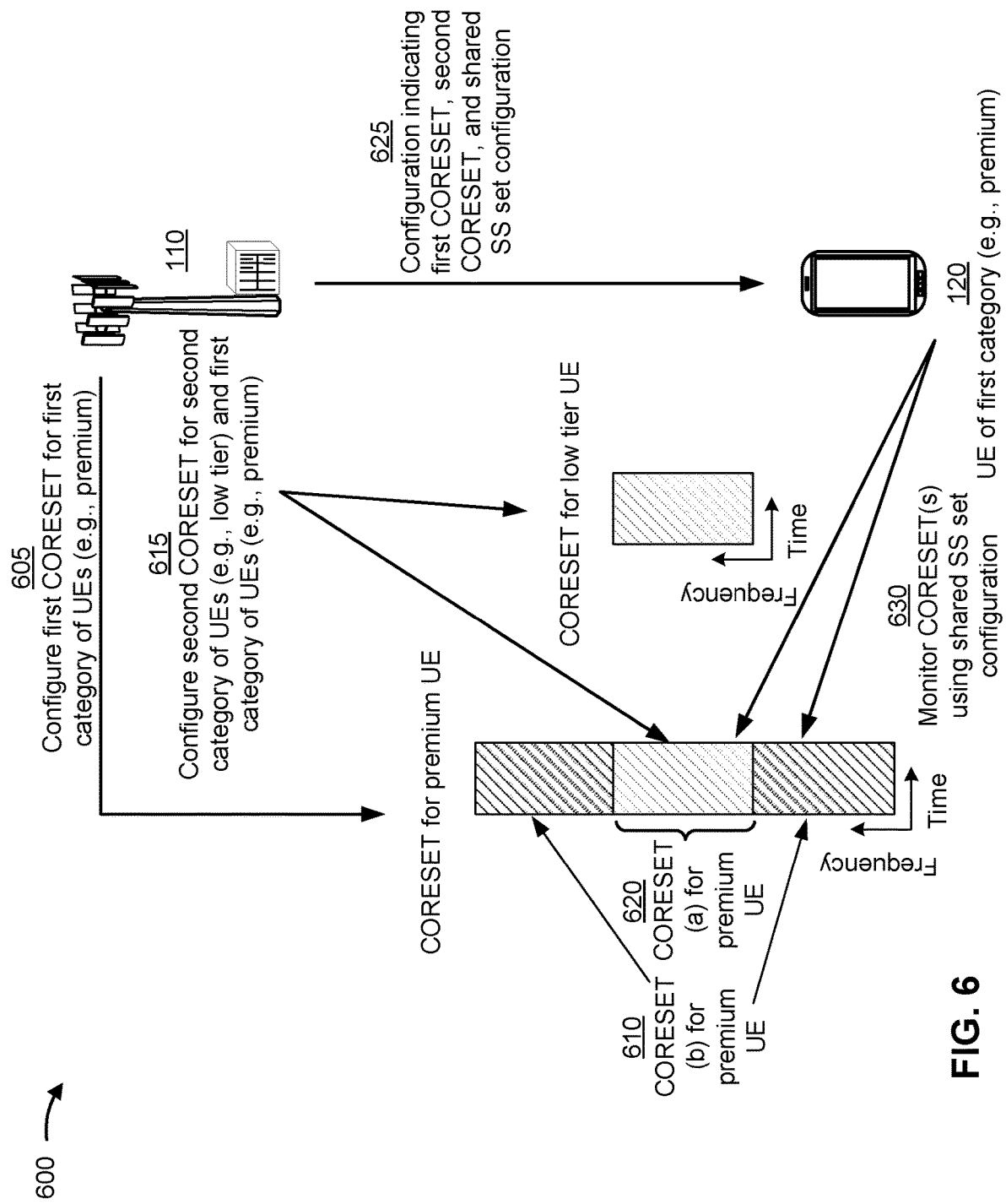

FIG. 6 is a diagram illustrating another example 600 of PDCCH coexistence for different UE categories, in accordance with various aspects of the present disclosure. As shown in FIG. 6, a base station 110 and a UE 120 may communicate with one another.

As shown by reference number 605, the base station 110 may configure a first CORESET for a first category of UEs, such as premium UEs. As shown by reference number 610, the first CORESET may have a first frequency domain resource allocation.

As shown by reference number 615, the base station 110 may configure a second CORESET for a second category of UEs, such as low tier UEs. In some aspects, the base station 110 may also configure the second CORESET for the first category of UEs. In this way, shared control channel information to be used by both low tier UEs and premium UEs may be transmitted using the second CORESET, thereby conserving network resources. Furthermore, premium UEs may monitor for PDCCH candidates using a larger frequency domain resource allocation (e.g., using both the first CORESET and the second CORESET) than that allocated for low tier UEs (e.g., which use only the second CORESET).

As shown by reference number 620, the second CORESET may have a second frequency domain resource allocation that is mutually exclusive with the first frequency domain resource allocation. For example, the first frequency domain resource allocation may include a first set of sub-carriers and/or RBs. The second frequency domain resource allocation may include a second set of sub-carriers and/or RBs. All of the sub-carriers and/or RBs included in the first set may be excluded from the second set, and all of the sub-carriers and/or RBs included in the second set may be excluded from the first set. As shown, in some aspects, the sub-carriers and/or RBs of the first frequency domain resource allocation may be non-contiguous. For example, the first frequency domain resource allocation in example 600 includes two portions separated by the second frequency domain resource allocation. As described above in connection with FIG. 5, the second CORESET may overlap completely in time with the first CORESET. In this way, due to the full overlap of PDCCHs of different UE categories, PDCCH interference and blocking due to a partial overlap may be avoided.

As shown by reference number 625, the base station 110 may transmit, to a UE 120, a configuration that indicates the first CORESET and the second CORESET. As shown in FIG. 6, in some aspects, the UE 120 may be a UE of the first category (e.g., a premium UE). In some aspects, the configuration is transmitted in a radio resource control (RRC) message, such as an RRC configuration message, an RRC reconfiguration message, and/or the like.

In some aspects, the configuration may indicate a shared SS set configuration that is used for both the first CORESET and the second CORESET. For example, the first CORESET and the second CORESET may share one or more SS set parameters indicated in the shared SS set configuration, such as a shared SS set periodicity, a shared symbol bit map (e.g., for SS set occasions), a shared set of aggregation levels, and/or the like. In some aspects, one or more SS set parameters may be different between the first CORESET and the second CORESET. For example, the first CORESET and the second CORESET may be configured with different numbers of PDCCH candidates per aggregation level.

Additionally, or alternatively, the configuration may indicate a shared CORESET configuration that is used for both the first CORESET and the second CORESET. For example, the first CORESET and the second CORESET may share one or more CORESET parameters indicated in the CORESET configuration, such as a shared demodulation reference signal (DMRS) configuration, a shared SS set symbol duration, a shared transmission configuration indicator (TCI) state, and/or the like. In some aspects, one or more CORESET parameters may be different between the first CORESET and the second CORESET. For example, the first CORESET and the second CORESET may be configured with different CORESET identifiers, different resource block bitmaps, and/or the like.

In example 600, the base station 110 may enable distributive CCE-to-REG mapping. For example, the configuration transmitted to the UE 120 may indicate a CCE-to-REG mapping type (e.g., using a cce-REG-MappingType parameter) that is set to an interleaved mode (e.g., an interleaved value) for the first CORESET and for the second CORESET. The base station 110 may apply CCE-to-REG mapping in the same manner for the second CORESET for both premium UEs and low tier UEs. In this way, because the first and second CORESETS are mutually exclusive in the frequency domain, CCE-to-REG mapping may be enabled in the scenario of example 600 (e.g., where the second CORESET overlaps in time with the first CORESET and has a second frequency domain resource allocation that is mutually exclusive with the first frequency domain resource allocation). In this way, resource diversity may be achieved, thereby improving performance.

As shown by reference number 630, the UE 120 (e.g., a premium UE) may monitor for one or more PDCCH candidates on the first CORESET and/or the second CORESET according to the shared SS set configuration. In this way, signaling overhead may be conserved by indicating shared SS set parameters and/or a shared CORESET configuration for the first CORESET and the second CORESET.

In some aspects, a UE 120 may not be configured with more than a maximum number of CORESETs. For example, the UE 120 may not be permitted to be configured with more than a maximum number of three CORESETs. However, because the first CORESET and the second CORESET overlap in time (and thus cannot have different beam configurations) and share some common configuration (e.g., an SS set configuration, a CORESET configuration, and/or the like), in some aspects, the first CORESET and the second CORESET may count as a single CORESET toward the maximum number (e.g., the limit) of CORESETS permitted to be configured for the UE 120. In this way, up to two additional CORESETs may be configured for the UE 120 in addition to the first CORESET and the second CORESET, thereby providing frequency diversity for PDCCH communications.

As indicated above, FIG. 6 is provided as an example. Other examples may differ from what is described with regard to FIG. 6.

Figure 7:
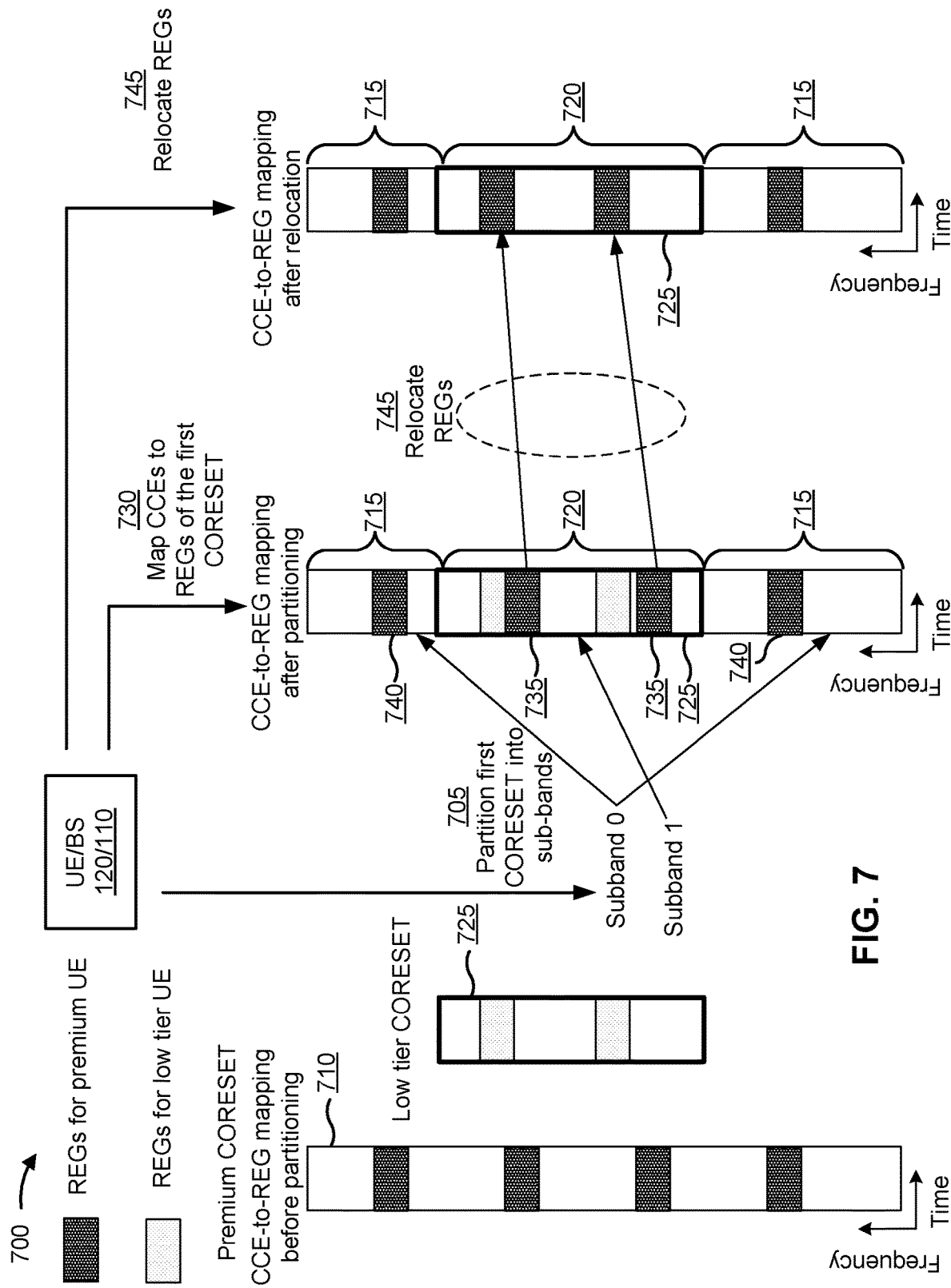

FIG. 7 is a diagram illustrating another example 700 of PDCCH coexistence for different UE categories, in accordance with various aspects of the present disclosure. Operations of FIG. 7 may be performed by a wireless communication device, such as a base station 110 and/or a UE 120 (e.g., a premium UE).

As shown by reference number 705, the wireless communication device may partition a first CORESET 710, configured for a first category of UEs (e.g., premium UEs), into a first sub-band 715 (shown as "Subband 0") and a second sub-band 720 (shown as "Subband 1"). The first sub-band 715 may not be included in a frequency domain resource allocation of a second CORESET 725 configured for a second category of UEs (e.g., low tier UEs), and the second sub-band 720 may be included in the frequency domain resource allocation of the second CORESET 725.

In some aspects, the first sub-band 715 and the second sub-band 720 may be mutually exclusive. For example, the first sub-band 715 may include a first set of sub-carriers and/or RBs. The second sub-band 720 may include a second set of sub-carriers and/or RBs. All of the sub-carriers and/or RBs included in the first set may be excluded from the second set, and all of the sub-carriers and/or RBs included in the second set may be excluded from the first set. As shown, in some aspects, the sub-carriers and/or RBs of the first sub-band 715 may be non-contiguous. For example, the first sub-band 715 in example 700 includes two portions separated by the second sub-band 720. As described above in connection with FIG. 5, the second CORESET 725 may overlap completely in time with the first CORESET 710. In this way, due to the full overlap of PDCCHs of different UE categories, PDCCH interference and blocking due to a partial overlap may be avoided.

As shown by reference number 730, the wireless communication device may map a set of CCEs of a PDCCH candidate to a set of REGs of the first CORESET. For example, the wireless communication device may perform CCE-to-REG mapping (as described above in connection with FIG. 4) using a first frequency domain resource allocation of the first CORESET as the physical resource domain to which REGs are mapped from CCEs. As shown by reference number 735, a subset of the REGs in the first frequency domain resource allocation may be included in a second frequency domain resource allocation of the second CORESET. As shown by reference number 740, in some aspects, another subset of the REGs in the first frequency domain resource allocation may not be included in the second frequency domain resource allocation.

As shown by reference number 745, the wireless communication device may relocate one or more REGs, of the set of REGs of the first CORESET, to be frequency-aligned with corresponding REGs configured for the second CORESET. In some aspects, the wireless communication device may relocate the one or more REGs based at least in part on a determination that the one or more REGs are included in the second sub-band 720. For example, the wireless communication device may relocate a first subset of the REGs in the first frequency domain resource allocation that are also included in the second frequency domain resource allocation (e.g., represented by reference number 735 in FIG. 7).

Conversely, the wireless communication device may refrain from relocating one or more REGs, of the set of REGs, that are included in the first sub-band 715. For example, the wireless communication device may refrain from relocating a second subset of the REGs in the first frequency domain resource allocation that are excluded from the second frequency domain resource allocation (e.g., represented by reference number 740 in FIG. 7).

The relocated REG(s) from the first CORESET may be aligned in frequency with corresponding REG(s) of PDCCH candidate(s) of the second CORESET such that a relocated REG occupies the same frequency resources as a corresponding REG. In some aspects, the one or more REGs are relocated based at least in part on at least one of an aggregation level supported by the second category of UEs, a PDCCH candidate index associated with a REG being relocated, a PDCCH candidate index associated with a REG configured for the second CORESET, a frequency domain distance between the REG being relocated and the REG configured for the second CORESET (e.g., a shortest distance, a shortest combined distance, and/or the like), and/or the like.

For example, the first CORESET may include REG A and REG B in the second sub-band 720, and the frequency range of REG A may be greater than the frequency range of REG B. The second CORESET may include REG C and REG D, and the frequency range of REG C may be greater than the frequency range of REG D. In this case, the wireless communication device may determine the shortest distance for relocating REGs by identifying a PDCCH candidate of the second CORESET that has a minimum value of a first absolute value, of an RB index (e.g., a lowest RB index, a highest RB index, and/or the like) of REG A minus an RB index (e.g., a lowest RB index, a highest RB index, and/or the like) of REG C, plus a second absolute value of an RB index of REG B minus an RB index of REG D. For example, the wireless communication device may determine corresponding REGs on the second CORESET as the REGs with the smallest combined distance between the REGs to be relocated, such as by calculating |lowest RB index of REG A−lowest RB index of REG C|+|lowest RB index of REG B−lowest RB index of REG D|, where |x| is the absolute value of number x. This example can be extended to the case of more than two REGs in the second sub-band 720. In some aspects, the lowest RB index may be used to calculate the smallest combined distance because there can be multiple PDCCH candidates of the second CORESET that have the shortest distance to REG A and REG B.

In some aspects, a PDCCH candidate of the second CORESET may not include enough corresponding REGs for the REGs of the first CORESET to be relocated, such as when the aggregation level of the second CORESET is smaller than the aggregation level of the first CORESET. In this case, the base station 110 would not be able to transmit the PDCCH candidate allocated for the first CORESET (e.g., for a premium UE). To overcome this issue, the wireless communication device may relocate the REGs of the first CORESET to REGs of multiple PDCCH candidates of the second CORESET. For example, the wireless communication device may relocate REGs from the first CORESET to REGs of PDCCH candidates (of the second CORESET) with indices that are the same as the premium UE PDCCH candidate index, that are the same as the premium UE PDCCH candidate index+1, and so on until all REGs are relocated. Additionally, or alternatively, the wireless communication device may relocate the REGs of the first CORESET to REGs of the low tier PDCCH candidate with a shortest combined distance, then the low tier PDCCH candidate with second shortest combined distance, and so on until all REGs are relocated.

In this way, due to the full overlap of PDCCHs of different UE categories, PDCCH interference and blocking due to a partial overlap may be avoided. Furthermore, distributive CCE-to-REG mapping (as described elsewhere herein) may be enabled in example 700, thereby providing resource diversity. Although example 700 is described in connection with partitioning the first CORESET into two sub-bands, the operations described herein may also apply to scenarios where the first CORESET is partitioned into more than two sub-bands.

As indicated above, FIG. 7 is provided as an example. Other examples may differ from what is described with regard to FIG. 7.

Figure 8:
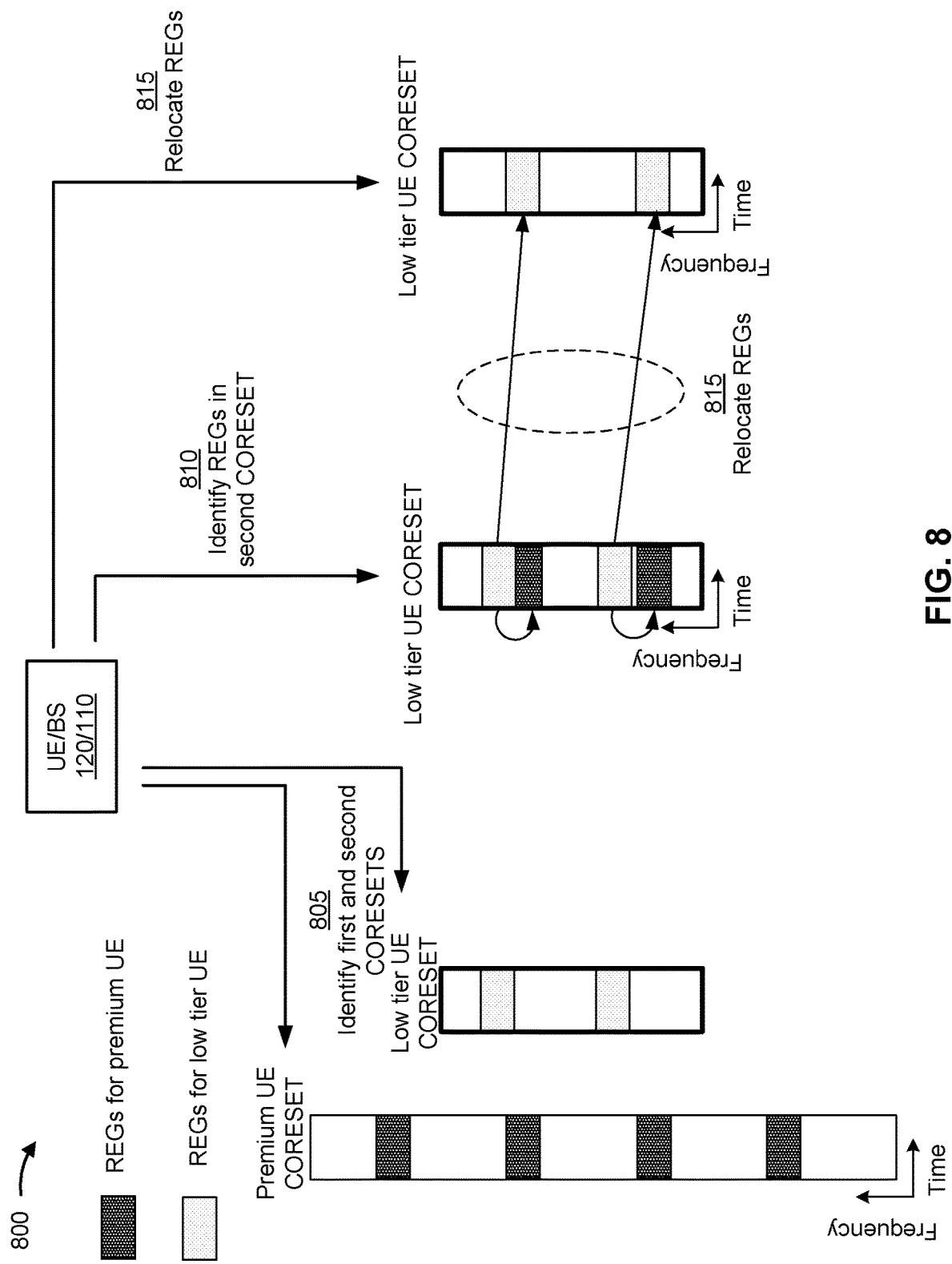

FIG. 8 is a diagram illustrating another example 800 of PDCCH coexistence for different UE categories, in accordance with various aspects of the present disclosure. Operations of FIG. 8 may be performed by a wireless communication device, such as a base station 110 and/or a UE 120 (e.g., a low tier UE).

As shown by reference number 805, the wireless communication device may identify a first CORESET configured for a first category of UEs (e.g., premium UEs) and a second CORESET configured for a second category of UEs (e.g., low tier UEs). The first CORESET may have a first frequency domain resource allocation. The second CORESET may have a second frequency domain resource allocation that is a subset of the first frequency domain resource allocation, as described elsewhere herein. As also described elsewhere herein, the second CORESET may overlap completely in time with the first CORESET.

As shown by reference number 810, the wireless communication device may identify a set of REGs for a PDCCH candidate included in the second frequency domain resource allocation (e.g., in the second CORESET). As shown by reference number 815, the wireless communication device may relocate the set of REGs to be frequency-aligned with corresponding REGs configured for the first CORESET, in a similar manner as described above in connection with FIG. 7, except that in example 800, REGs of the second CORESET are relocated to be frequency-aligned with corresponding REGs of the first CORESET (rather than REGs of the first CORESET being relocated to be frequency-aligned with corresponding REGs of the second CORESET). In some aspects, the set of REGs are relocated based at least in part on a PDCCH candidate index associated with a REG configured for the first CORESET, a frequency domain distance between a REG being relocated and the REG configured for the first CORESET (e.g., a shortest distance, a shortest combined distance, and/or the like), and/or the like, in a similar manner as described above in connection with FIG. 7.

In this way, due to the full overlap of PDCCHs of different UE categories, PDCCH interference and blocking due to a partial overlap may be avoided. Furthermore, distributive CCE-to-REG mapping (as described elsewhere herein) may be enabled in example 800, thereby providing resource diversity.

As indicated above, FIG. 8 is provided as an example. Other examples may differ from what is described with regard to FIG. 8.

FIG. 9 is a diagram illustrating an example process 900 performed, for example, by a UE, in accordance with various aspects of the present disclosure. Example process 900 is an example where a UE (e.g., UE 120 and/or the like)

performs operations associated with physical downlink control channel coexistence for different user equipment categories.

As shown in FIG. 9, in some aspects, process 900 may include receiving a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation (block 910). For example, the UE (e.g., using receive processor 258, controller/processor 280, memory 282, and/or the like) may receive a configuration that indicates a first control resource set (CORESET) configured for a first category of UEs and a second CORESET configured for a second category of UEs with which the UE is associated, as described above. In some aspects, the first CORESET has a first frequency domain resource allocation. In some aspects, the second CORESET overlaps in time with the first CORESET and has a second frequency domain resource allocation that is a subset of the first frequency domain resource allocation.

As further shown in FIG. 9, in some aspects, process 900 may include monitoring for a physical downlink control channel (PDCCH) candidate based at least in part on a determination that the PDCCH candidate is fully contained within the second frequency domain resource allocation (block 920). For example, the UE (e.g., using receive processor 258, controller/processor 280, memory 282, and/or the like) may monitor for a physical downlink control channel (PDCCH) candidate based at least in part on a determination that the PDCCH candidate is fully contained within the second frequency domain resource allocation, as described above.

Process 900 may include additional aspects, such as any single aspect or any combination of aspects described below and/or in connection with one or more other processes described elsewhere herein.

In a first aspect, a first search space (SS) set occasion configured for the first CORESET overlaps completely in time with a second SS set occasion configured for the second CORESET.

In a second aspect, alone or in combination with the first aspect, the first frequency domain resource allocation is indicated using a resource block bitmap.

In a third aspect, alone or in combination with one or more of the first and second aspects, the second frequency domain resource allocation is indicated using at least one of a resource block bitmap, a starting resource block, an ending resource block, a number of resource blocks that span the second frequency domain resource allocation, a range of resource blocks, or a combination thereof.

In a fourth aspect, alone or in combination with one or more of the first through third aspects, frequency mapping for a set of PDCCH candidates is based at least in part on the first frequency domain resource allocation, and a subset of the set of PDCCH candidates are included in the second frequency domain resource allocation.

In a fifth aspect, alone or in combination with one or more of the first through fourth aspects, the PDCCH candidate is determined to be fully contained within the second frequency domain resource allocation if all resource blocks of the PDCCH candidate are within the second frequency domain resource allocation.

In a sixth aspect, alone or in combination with one or more of the first through fifth aspects, a control channel element (CCE) to resource element group (REG) mapping type is set to a non-interleaved mode for the first CORESET and the second CORESET.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with physical downlink control channel coexistence for different user equipment categories.

As shown in FIG. 10, in some aspects, process 1000 may include receiving a configuration that indicates a first control resource set (CORESET) configured for the UE, a second CORESET configured for the UE, and a shared search space (SS) set configuration that is used for both the first CORESET and the second CORESET, wherein the second CORESET overlaps in time with the first CORESET (block 1010). For example, the UE (e.g., using receive processor 258, controller/processor 280, memory 282, and/or the like) may receive a configuration that indicates a first control resource set (CORESET) configured for the UE, a second CORESET configured for the UE, and a shared search space (SS) set configuration that is used for both the first CORESET and the second CORESET, as described above. In some aspects, the second CORESET overlaps in time with the first CORESET.

As further shown in FIG. 10, in some aspects, process 1000 may include monitoring for one or more physical downlink control channel (PDCCH) candidates on at least one of the first CORESET or the second CORESET according to the shared SS set configuration (block 1020). For example, the UE (e.g., using receive processor 258, controller/processor 280, memory 282, and/or the like) may monitor for one or more physical downlink control channel (PDCCH) candidates on at least one of the first CORESET or the second CORESET according to the shared SS set configuration, as described above.

Process 1000 may include additional aspects, such as any single aspect or any combination of aspects described below and/or in connection with one or more other processes described elsewhere herein.

In a first aspect, the UE is in a first category of UEs and the second CORESET is also configured for a second category of UEs.

In a second aspect, alone or in combination with the first aspect, a control channel element (CCE) to resource element group (REG) mapping type is set to an interleaved mode for the first CORESET and the second CORESET.

In a third aspect, alone or in combination with one or more of the first and second aspects, the shared SS set configuration indicates a different number of PDCCH candidates per aggregation level for the first CORESET as compared to the second CORESET.

In a fourth aspect, alone or in combination with one or more of the first through third aspects, the shared SS set configuration includes at least one of a shared SS set periodicity, a shared symbol bit map, a shared set of aggregation levels, or a combination thereof.

In a fifth aspect, alone or in combination with one or more of the first through fourth aspects, the configuration further indicates a shared CORESET configuration that is used for both the first CORESET and the second CORESET.

In a sixth aspect, alone or in combination with one or more of the first through fifth aspects, the shared CORESET configuration indicates at least one of a different resource block bitmap or a different CORESET identifier for the first CORESET as compared to the second CORESET.

In a seventh aspect, alone or in combination with one or more of the first through sixth aspects, the shared CORESET configuration includes at least one of a shared demodulation reference signal configuration, a shared SS set symbol duration, a shared transmission configuration indicator (TCI) state, or a combination thereof.

In an eighth aspect, alone or in combination with one or more of the first through seventh aspects, the first CORESET and the second CORESET count as a single CORESET toward a limit of a number of CORESETS permitted to be configured for the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a wireless communication device, in accordance with various aspects of the present disclosure. Example process 1100 is an example where a wireless communication device (e.g., base station 110, UE 120, and/or the like) performs operations associated with physical downlink control channel coexistence for different user equipment categories.

As shown in FIG. 11, in some aspects, process 1100 may include partitioning a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET (block 1110). For example, the wireless communication device (e.g., using controller/processor 240, controller/processor 280, memory 242, memory 282, and/or the like) may determine may partition a first control resource set (CORESET), configured for a first category of user equipments (UEs), into a first sub-band and a second sub-band, as described above. In some aspects, the first sub-band is not included in a frequency domain resource allocation of a second CORESET configured for a second category of UEs and the second sub-band is included in the frequency domain resource allocation of the second CORESET.

As further shown in FIG. 11, in some aspects, process 1100 may include mapping a set of control channel elements (CCEs) of a physical downlink control channel (PDCCH) candidate to a set of resource element groups (REGs) of the first CORESET (block 1120). For example, the wireless communication (e.g., using controller/processor 240, controller/processor 280, memory 242, memory 282, and/or the like) may map a set of control channel elements (CCEs) of a physical downlink control channel (PDCCH) candidate to a set of resource element groups (REGs) of the first CORESET, as described above.

As further shown in FIG. 11, in some aspects, process 1100 may include relocating one or more REGs of the set of REGs to be frequency-aligned with corresponding REGs configured for the second CORESET based at least in part on a determination that the one or more REGs are included in the second sub-band (block 1130). For example, the wireless communication device (e.g., using controller/processor 240, controller/processor 280, memory 242, memory 282, and/or the like) may relocate one or more REGs of the set of REGs to be frequency-aligned with corresponding REGs configured for the second CORESET based at least in part on a determination that the one or more REGs are included in the second sub-band, as described above.

Process 1100 may include additional aspects, such as any single aspect or any combination of aspects described below and/or in connection with one or more other processes described elsewhere herein.

In a first aspect, process 1100 includes refraining from relocating one or more REGs, of the set of REGs, that are included in the first sub-band.

In a second aspect, alone or in combination with the first aspect, the one or more REGs are relocated based at least in part on at least one of an aggregation level supported by the second category of UEs, a PDCCH candidate index associated with a REG being relocated, a PDCCH candidate index associated with a REG configured for the second CORESET, a frequency domain distance between the REG being relocated and the REG configured for the second CORESET, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a wireless communication device, in accordance with various aspects of the present disclosure. Example process 1200 is an example where a wireless communication device (e.g., base station 110, UE 120, and/or the like) performs operations associated with physical downlink control channel coexistence for different user equipment categories.

As shown in FIG. 12, in some aspects, process 1200 may include identifying a first control resource set (CORESET) configured for a first category of user equipments (UEs) and a second CORESET configured for a second category of UEs, wherein the first CORESET has a first frequency domain resource allocation, and wherein the second CORESET overlaps in time with the first CORESET and has a second frequency domain resource allocation that is a subset of the first frequency domain resource allocation (block 1210). For example, the wireless communication device (e.g., using controller/processor 240, controller/processor 280, memory 242, memory 282, and/or the like) may identify a first control resource set (CORESET) configured for a first category of user equipments (UEs) and a second CORESET configured for a second category of UEs, as described above. In some aspects, the first CORESET has a first frequency domain resource allocation. In some aspects, the second CORESET overlaps in time with the first CORESET and has a second frequency domain resource allocation that is a subset of the first frequency domain resource allocation.

As further shown in FIG. 12, in some aspects, process 1200 may include identifying a set of resource element groups (REGs) for a physical downlink control channel (PDCCH) candidate included in the second frequency domain resource allocation (block 1220). For example, the wireless communication device (e.g., using controller/processor 240, controller/processor 280, memory 242, memory 282, and/or the like) may identify a set of resource element groups (REGs) for a physical downlink control channel (PDCCH) candidate included in the second frequency domain resource allocation, as described above.

As further shown in FIG. 12, in some aspects, process 1200 may include relocating the set of REGs to be frequency-aligned with corresponding REGs configured for the first CORESET (block 1230). For example, the wireless communication device (e.g., using controller/processor 240, controller/processor 280, memory 242, memory 282, and/or the like) may relocate the set of REGs to be frequency-aligned with corresponding REGs configured for the first CORESET, as described above.

Process 1200 may include additional aspects, such as any single aspect or any combination of aspects described below and/or in connection with one or more other processes described elsewhere herein.

In a first aspect, the set of REGs are relocated based at least in part on a PDCCH candidate index associated with a REG configured for the first CORESET, a frequency domain distance between a REG being relocated and the REG configured for the first CORESET, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
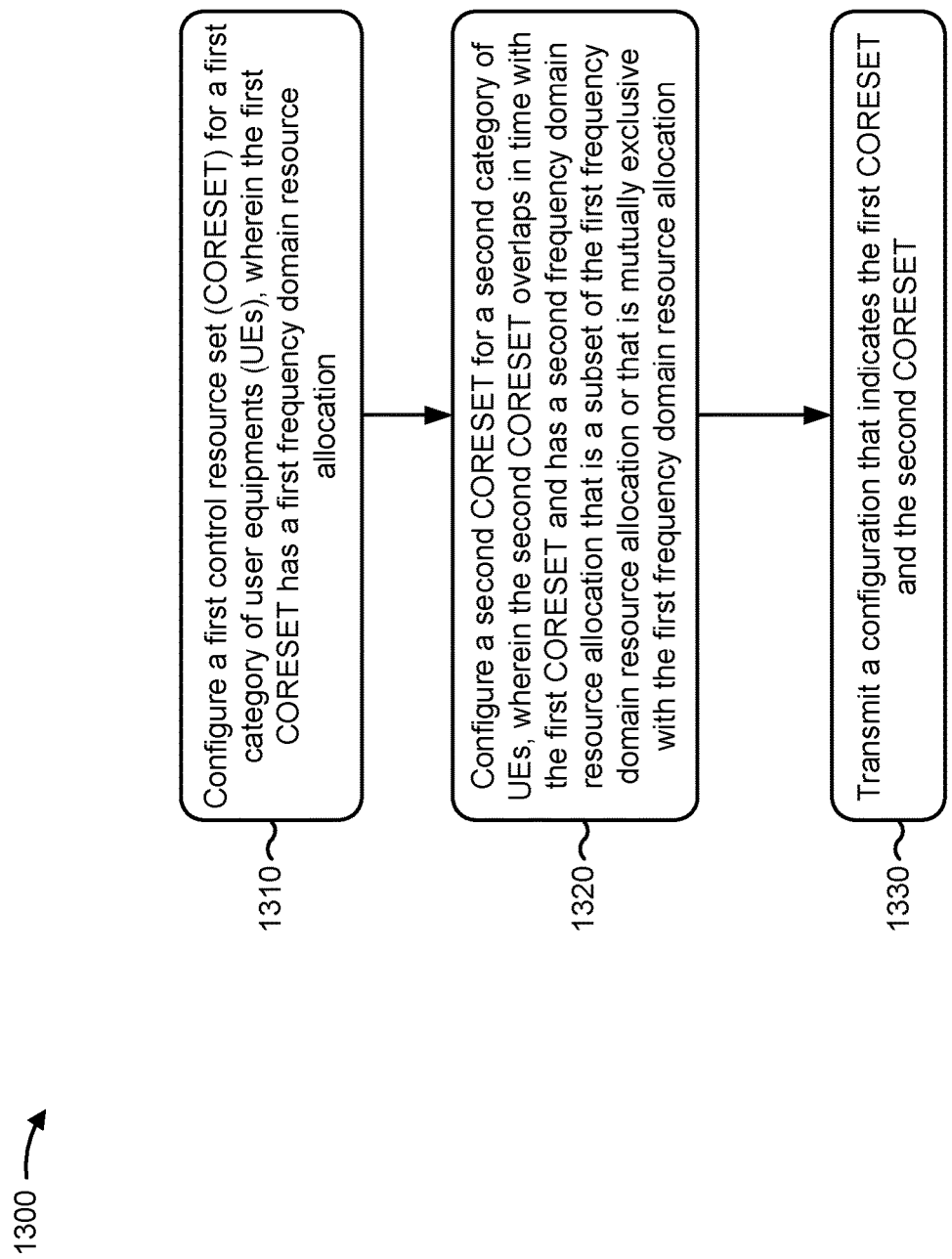

FIG. 13 is a diagram illustrating an example process 1300 performed, for example, by a base station, in accordance with various aspects of the present disclosure. Example process 1300 is an example where a base station (e.g., base station 110 and/or the like) performs operations associated with physical downlink control channel coexistence for different user equipment categories.

As shown in FIG. 13, in some aspects, process 1300 may include configuring a first control resource set (CORESET) for a first category of user equipments (UEs), wherein the first CORESET has a first frequency domain resource allocation (block 1310). For example, the base station (e.g., using transmit processor 220, controller/processor 240, memory 242, and/or the like) may configure a first control resource set (CORESET) for a first category of user equipments (UEs), as described above. In some aspects, the first CORESET has a first frequency domain resource allocation.

As further shown in FIG. 13, in some aspects, process 1300 may include configuring a second CORESET for a second category of UEs, wherein the second CORESET overlaps in time with the first CORESET and has a second frequency domain resource allocation that is a subset of the first frequency domain resource allocation or that is mutually exclusive with the first frequency domain resource allocation (block 1320). For example, the base station (e.g., using transmit processor 220, controller/processor 240, memory 242, and/or the like) may configure a second CORESET for a second category of UEs, as described above. In some aspects, the second CORESET overlaps in time with the first CORESET and has a second frequency domain resource allocation that is a subset of the first frequency domain resource allocation or that is mutually exclusive with the first frequency domain resource allocation.

As further shown in FIG. 13, in some aspects, process 1300 may include transmitting a configuration that indicates the first CORESET and the second CORESET (block 1330). For example, the base station (e.g., using transmit processor 220, controller/processor 240, memory 242, and/or the like) may transmit a configuration that indicates the first CORESET and the second CORESET, as described above.

Process 1300 may include additional aspects, such as any single aspect or any combination of aspects described below and/or in connection with one or more other processes described elsewhere herein.

In a first aspect, the configuration is transmitted to one or more UEs of the second category of UEs.

In a second aspect, alone or in combination with the first aspect, a first search space (SS) set occasion configured for the first CORESET overlaps completely in time with a second SS set occasion configured for the second CORESET.

In a third aspect, alone or in combination with one or more of the first and second aspects, the first frequency domain resource allocation is indicated using a resource block bitmap.

In a fourth aspect, alone or in combination with one or more of the first through third aspects, the second frequency domain resource allocation is indicated using at least one of a resource block bitmap, a starting resource block, an ending resource block, a number of resource blocks that span the second frequency domain resource allocation, a range of resource blocks, or a combination thereof.

In a fifth aspect, alone or in combination with one or more of the first through fourth aspects, frequency mapping for a set of PDCCH candidates is based at least in part on the first frequency domain resource allocation, and a subset of the set of PDCCH candidates are included in the second frequency domain resource allocation.

In a sixth aspect, alone or in combination with one or more of the first through fifth aspects, the configuration further indicates a control channel element (CCE) to resource element group (REG) mapping type that is set to a non-interleaved mode for the first CORESET and the second CORESET.

In a seventh aspect, alone or in combination with one or more of the first through sixth aspects, the configuration is transmitted to one or more UEs of the first category of UEs.

In an eighth aspect, alone or in combination with one or more of the first through seventh aspects, the second CORESET is also configured for the first category of UEs.

In a ninth aspect, alone or in combination with one or more of the first through eighth aspects, the configuration further indicates a control channel element (CCE) to resource element group (REG) mapping type that is set to an interleaved mode for the first CORESET and the second CORESET.

In a tenth aspect, alone or in combination with one or more of the first through ninth aspects, the configuration further indicates a shared search space (SS) set configuration that is used for both the first CORESET and the second CORESET.

In an eleventh aspect, alone or in combination with one or more of the first through tenth aspects, the shared SS set configuration indicates a different number of PDCCH candidates per aggregation level for the first CORESET as compared to the second CORESET.

In a twelfth aspect, alone or in combination with one or more of the first through eleventh aspects, the shared SS set configuration includes at least one of a shared SS set periodicity, a shared symbol bit map, a shared set of aggregation levels, or a combination thereof.

In a thirteenth aspect, alone or in combination with one or more of the first through twelfth aspects, the configuration further indicates a shared CORESET configuration that is used for both the first CORESET and the second CORESET.

In a fourteenth aspect, alone or in combination with one or more of the first through thirteenth aspects, the shared CORESET configuration indicates at least one of a different resource block bitmap or a different CORESET identifier for the first CORESET as compared to the second CORESET.

In a fifteenth aspect, alone or in combination with one or more of the first through fourteenth aspects, the shared CORESET configuration includes at least one of a shared demodulation reference signal configuration, a shared SS set symbol duration, a shared transmission configuration indicator (TCI) state, or a combination thereof.

In a sixteenth aspect, alone or in combination with one or more of the first through fifteenth aspects, the first CORESET and the second CORESET count as a single CORESET toward a limit of a number of CORESETS permitted to be configured for a UE of the first category of UEs.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation, wherein a first search space (SS) set occasion configured for the first CORESET overlaps completely in time with a second SS set occasion configured for the second CORESET, wherein one or more parameters of a SS set configuration of the first CORESET are the same as one or more parameters of a SS set configuration of the second CORESET, wherein the one or more parameters comprise: a SS set periodicity, a SS symbol bitmap, or a SS aggregation level; and
   monitoring for a physical downlink control channel (PDCCH) candidate based at least in part on a determination that the PDCCH candidate is fully contained within the second frequency domain resource allocation.

2. The method of claim 1,
wherein the first frequency domain resource allocation is indicated using a resource block bitmap.

3. The method of claim 1,
wherein the second frequency domain resource allocation is indicated using at least one of a resource block bitmap, a starting resource block, an ending resource block, a number of resource blocks that span the second frequency domain resource allocation, a range of resource blocks, or a combination thereof.

4. The method of claim 1,
wherein frequency mapping for a set of PDCCH candidates is based at least in part on the first frequency domain resource allocation, and wherein a subset of the set of PDCCH candidates are included in the second frequency domain resource allocation.

5. The method of claim 1,
wherein the PDCCH candidate is determined to be fully contained within the second frequency domain resource allocation if all resource blocks of the PDCCH candidate are within the second frequency domain resource allocation.

6. The method of claim 1, wherein a control channel element (CCE) to resource element group (REG) mapping type is set to a non-interleaved mode for the first CORESET and the second CORESET.

7. The method of claim 1, wherein a control channel element (CCE) to resource element group (REG) mapping type is set to an interleaved mode for the first CORESET and the second CORESET.

8. A method of wireless communication performed by a wireless communication device, comprising:
partitioning a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET;
mapping a set of control channel elements (CCEs) of a physical downlink control channel (PDCCH) candidate to a set of resource element groups (REGs) of the first CORESET; and
relocating one or more REGs of the set of REGs to be frequency-aligned with corresponding REGs configured for the second CORESET based at least in part on a determination that the one or more REGs are included in the second sub-band.

9. The method of claim 8, further comprising refraining from relocating one or more REGs, of the set of REGs, that are included in the first sub-band.

10. The method of claim 8, wherein the one or more REGs are relocated based at least in part on at least one of an aggregation level supported by the second category of UEs, a PDCCH candidate index associated with a REG being relocated, a PDCCH candidate index associated with a REG configured for the second CORESET, a frequency domain distance between the REG being relocated and the REG configured for the second CORESET, or a combination thereof.

11. A user equipment (UE) for wireless communication, comprising:
a memory; and
one or more processors coupled to the memory, the memory and the one or more processors configured to:
receive a configuration that indicates a first control resource set (CORESET) configured for a first category of UEs and a second CORESET configured for a second category of UEs with which the UE is associated, wherein the first CORESET has a first frequency domain resource allocation, and wherein the second CORESET overlaps in time with the first CORESET and has a second frequency domain resource allocation that is a subset of the first frequency domain resource allocation, wherein a first search space (SS) set occasion configured for the first CORESET overlaps completely in time with a second SS set occasion configured for the second CORESET, wherein one or more parameters of a SS set configuration of the first CORESET are the same as one or more parameters of a SS set configuration of the second CORESET, wherein the one or more parameters comprise: a SS set periodicity, a SS symbol bitmap, or a SS aggregation level; and
monitor for a physical downlink control channel (PDCCH) candidate based at least in part on a determination that the PDCCH candidate is fully contained within the second frequency domain resource allocation.

12. The UE of claim 11, wherein the first frequency domain resource allocation is indicated using a resource block bitmap.

13. The UE of claim 11, wherein the second frequency domain resource allocation is indicated using at least one of a resource block bitmap, a starting resource block, an ending resource block, a number of resource blocks that span the second frequency domain resource allocation, a range of resource blocks, or a combination thereof.

14. The UE of claim 11, wherein frequency mapping for a set of PDCCH candidates is based at least in part on the first frequency domain resource allocation, and wherein a subset of the set of PDCCH candidates are included in the second frequency domain resource allocation.

15. The UE of claim 11, wherein the PDCCH candidate is determined to be fully contained within the second frequency domain resource allocation if all resource blocks of the PDCCH candidate are within the second frequency domain resource allocation.

16. The UE of claim 11, wherein a control channel element (CCE) to resource element group (REG) mapping type is set to a non-interleaved mode for the first CORESET and the second CORESET.

17. The UE of claim 11, wherein a control channel element (CCE) to resource element group (REG) mapping type is set to an interleaved mode for the first CORESET and the second CORESET.

18. A wireless communication device for wireless communication, comprising:
a memory; and
one or more processors coupled to the memory, the memory and the one or more processors configured to:
partition a first control resource set (CORESET), configured for a first category of user equipments (UEs), into a first sub-band and a second sub-band, wherein the first sub-band is not included in a frequency domain resource allocation of a second CORESET configured for a second category of UEs and the second sub-band is included in the frequency domain resource allocation of the second CORESET;
map a set of control channel elements (CCEs) of a physical downlink control channel (PDCCH) candidate to a set of resource element groups (REGs) of the first CORESET; and
relocate one or more REGs of the set of REGs to be frequency-aligned with corresponding REGs configured for the second CORESET based at least in part on a determination that the one or more REGs are included in the second sub-band.

19. The wireless communication device of claim 18, wherein the one or more processors are further configured to refrain from relocating one or more REGs, of the set of REGs, that are included in the first sub-band.

20. The wireless communication device of claim 18, wherein the one or more REGs are relocated based at least in part on at least one of an aggregation level supported by the second category of UEs, a PDCCH candidate index associated with a REG being relocated, a PDCCH candidate index associated with a REG configured for the second CORESET, a frequency domain distance between the REG being relocated and the REG configured for the second CORESET, or a combination thereof.

\* \* \* \* \*